(12) United States Patent
Wilkins et al.

(10) Patent No.: US 10,552,829 B2
(45) Date of Patent: Feb. 4, 2020

(54) OBFUSCATION OF INTENT IN TRANSACTIONS USING CRYPTOGRAPHIC TECHNIQUES

(71) Applicant: tZERO Group, Inc., New York, NY (US)

(72) Inventors: Alec Wilkins, Salt Lake City, UT (US); Eric Nathaniel Fish, Salt Lake City, UT (US); Trent Norman Larson, Salt Lake City, UT (US)

(73) Assignee: tZERO Group, Inc., New York, NY (US)

( * ) Notice: Subject to any disclaimer, the term of this patent is extended or adjusted under 35 U.S.C. 154(b) by 672 days.

(21) Appl. No.: 15/164,341

(22) Filed: May 25, 2016

(65) Prior Publication Data

US 2016/0350749 A1 Dec. 1, 2016

Related U.S. Application Data

(60) Provisional application No. 62/166,515, filed on May 26, 2015.

(51) Int. Cl.
*G06Q 40/04* (2012.01)
*G06Q 20/38* (2012.01)
(Continued)

(52) U.S. Cl.
CPC ......... *G06Q 20/382* (2013.01); *G06Q 20/401* (2013.01); *G06Q 40/04* (2013.01); *G06Q 40/12* (2013.12); *G06Q 2220/00* (2013.01)

(58) Field of Classification Search
CPC ........ G96Q 10/00; G06Q 20/00; G06Q 30/00; G06Q 40/00
(Continued)

(56) References Cited

U.S. PATENT DOCUMENTS 6,629,082 B1  9/2003  Hambrecht et al.
6,668,325 B1  12/2003  Collberg et al.
(Continued)

FOREIGN PATENT DOCUMENTS

GB     2514716 A      12/2014
WO     2001084906 A2  11/2001
(Continued)

OTHER PUBLICATIONS

Mills et al. "Distributed ledger technology in payments, clearing and settlement", Finance and Economics Discussion Series, Divisions of Research & Statistics and Monetary Affairs Federal Reserve Board, Washington DC. (Year: 2016).*
(Continued)

*Primary Examiner* — Frantzy Poinvil
(74) *Attorney, Agent, or Firm* — Fogg & Power LLC

(57) ABSTRACT

Methods and systems described herein prevent traders from using order intent and hardware solutions to advance their order position by obfuscating the order until execution and by using a digital ledger to assign priority of the orders. As described herein, using a series of cryptographic key pairs, one side of a transaction can be created, matched, and executed while a public record is recorded and maintained but obfuscated (i.e., not publicly transparent) until after the transaction is completed.

18 Claims, 11 Drawing Sheets

(51) Int. Cl.
*G06Q 20/40* (2012.01)
*G06Q 40/00* (2012.01)

(58) Field of Classification Search
USPC .................................................. 705/3–44, 75
See application file for complete search history.

(56) References Cited

U.S. PATENT DOCUMENTS

| | | | | |
|---|---|---|---|---|
| 7,069,234 | B1* | 6/2006 | Cornelius | G06Q 20/10 705/26.35 |
| 7,130,807 | B1* | 10/2006 | Mikurak | G06Q 10/06 705/7.25 |
| 7,587,358 | B2 | 9/2009 | Hambrecht et al. | |
| 7,716,467 | B1* | 5/2010 | Deffet | H04L 63/0471 713/153 |
| 8,024,258 | B2* | 9/2011 | Gastineau | G06Q 30/08 705/37 |
| 8,117,112 | B2 | 2/2012 | Hambrecht et al. | |
| 8,204,821 | B2 | 6/2012 | Staib et al. | |
| 8,355,973 | B2* | 1/2013 | Geller | G06Q 40/06 705/35 |
| 8,712,920 | B2* | 4/2014 | Walker | G06Q 10/02 705/77 |
| 8,732,023 | B2* | 5/2014 | Mikurak | G06Q 10/087 705/22 |
| 9,020,850 | B1* | 4/2015 | Anderson | G06Q 40/02 705/35 |
| 9,177,313 | B1 | 11/2015 | Silverman | |
| 9,397,985 | B1 | 7/2016 | Seger, II et al. | |
| 9,704,143 | B2* | 7/2017 | Walker | G06Q 20/06 |
| 2002/0128958 | A1 | 9/2002 | Slone | |
| 2004/0064351 | A1* | 4/2004 | Mikurak | G06Q 10/087 705/22 |
| 2006/0064372 | A1 | 3/2006 | Gupta | |
| 2007/0106892 | A1 | 5/2007 | Engberg | |
| 2008/0313068 | A1 | 12/2008 | Sun | |
| 2009/0177591 | A1 | 7/2009 | Thorpe et al. | |
| 2011/0071935 | A1* | 3/2011 | Balabon | G06Q 40/04 705/37 |
| 2011/0164192 | A1* | 7/2011 | Ozawa | G03B 21/14 348/744 |
| 2011/0295736 | A1* | 12/2011 | Freer | G06Q 40/04 705/37 |
| 2013/0006840 | A1 | 1/2013 | Cahn | |
| 2013/0086393 | A1 | 4/2013 | Pogmore | |
| 2013/0218741 | A1 | 8/2013 | Fenichel et al. | |
| 2013/0268772 | A1 | 10/2013 | Golle | |
| 2014/0052598 | A1 | 2/2014 | Briem | |
| 2014/0201057 | A1 | 7/2014 | Shuster | |
| 2015/0026072 | A1 | 1/2015 | Zhou et al. | |
| 2015/0046337 | A1 | 2/2015 | Hu et al. | |
| 2015/0220928 | A1* | 8/2015 | Allen | G06Q 20/0655 705/67 |
| 2015/0262168 | A1* | 9/2015 | Armstrong | G06Q 20/065 705/39 |
| 2015/0332395 | A1* | 11/2015 | Walker | G06O 20/06 705/69 |
| 2016/0092988 | A1* | 3/2016 | Letourneau | G06Q 40/06 705/66 |
| 2016/0217436 | A1 | 7/2016 | Brama | |
| 2016/0224949 | A1 | 8/2016 | Thomas et al. | |
| 2016/0234026 | A1 | 8/2016 | Wilkins et al. | |
| 2016/0260169 | A1 | 9/2016 | Arnold et al. | |
| 2016/0261685 | A1 | 9/2016 | Chen et al. | |
| 2016/0261690 | A1 | 9/2016 | Ford | |
| 2016/0267474 | A1 | 9/2016 | Lingham et al. | |
| 2016/0267566 | A1 | 9/2016 | Levitt et al. | |
| 2016/0267605 | A1 | 9/2016 | Lingham et al. | |
| 2016/0292680 | A1 | 10/2016 | Wilson, Jr. et al. | |
| 2016/0321751 | A1 | 11/2016 | Creighton, IV et al. | |
| 2016/0321752 | A1 | 11/2016 | Tabacco et al. | |
| 2017/0109744 | A1 | 4/2017 | Wilkins et al. | |
| 2019/0140842 | A1 | 5/2019 | Wilkins et al. | |

FOREIGN PATENT DOCUMENTS

| | | |
|---|---|---|
| WO | 2012123394 A1 | 9/2012 |
| WO | 2016178999 A1 | 11/2016 |
| WO | 2017131929 A1 | 8/2017 |

OTHER PUBLICATIONS

International Search Authority, "International Search Report for PCT/US16/34130", "Foreign counterpart to U.S. Appl. No. 15/164,341", dated Jan. 27, 2016, pp. 18, Published in: WO.

Intellectual Property Office of Singapore, "Notice of Eligibility for Grant and Examination Report from SG Application No. 11201709186S dated Jul. 18, 2019", from Foreign Counterpart to U.S. Appl. No. 15/164,341, pp. 1-7, Published: SG.

Anonymous, "Bitcoin", "https://en.wikipedia.org/w/index.php?title+Bitcoin&oldid+646184058", Feb. 8, 2015, pp. 1-39, XP055319200, Publisher: Wikipedia, The Free Encyclopedia. Retrieved on Nov. 14, 2016.

Anonymous, "Digital Signature", "https://en.wikipedia.org/w/index.php?title=Digital_signature&oldid=646145535", Feb. 8, 2015, pp. 1-11, XP055319249, Publisher: Wikipedia, The Free Encyclopedia. Retrieved on Nov. 14, 2016.

Bhanot et al, "Distributed Ledgers: Possibilities and Challenges in Capital Markets Applications", "Cognizant 20-20 Insights", "https://www.cognizant.com/whitepapers/distributed-ledgers-possibilities-and-challenges-in-capital-markets-applications-codex1974.pdf", Dated Jun. 1, 2016, Retrieved on Feb. 20, 2018, pp. 1-10, Publisher: Cognizant.

BTC Inc, "Overstock Plans to Open Blockchain-Based Stock Exchange to to Other Publicly Traded Companies", "https://distributed.com/news/overstock-plans-to-open-blockchain-based-stock-exchange-t-totother-publicly-traded-companies/", Retrieved on Mar. 27, 2018, pp. 1-6, Publisher: BTC Media.

Del Castillo, "Overstock Raises $10.9 Million in First Blockchain Stock Issuance", "CoinDesk", "https://www.coindesk.com/overstock-first-blockchain-stock-issuance/", Updated Dec. 16, 2016, Retrieved Feb. 20, 2018, pp. 1-5.

European Patent Office, "Communication pursuant to Article 94(3) from EP Application No. 16766103.2 dated Mar. 15, 2019", from Foreign Counterpart to U.S. Appl. No. 15/017,359, pp. 1-9, Published: EP.

European Patent Office, "Extended European Search Report from EP Application No. 16835564.2 dated Jan. 8, 2019", from Foreign Counterpart to U.S. Appl. No. 15/164,341, pp. 1-7, Published: EP.

Finextra, "Overstock Looks to Issue Bitcoin-Style Stocks", "Finextra", "https://www.finextra.com/newsarticle/27294/overstock-looks-to-issue-bitcoin-style-stocks", Dated Apr. 29, 201, Retrieved on Feb. 20, 2018, pp. 1-3.

Guagliardo et al, "Blockchain and Public Securities: Shedding Light on 'Going Dark'", "Power of Intelligence, Insight Center: Publications", "http://www.pepperlaw.com/publications/blockchain-and-public-securities-shedding-light-on-going-dark-2016-09-27/", Dated Sep. 27, 2016, Retrieved on Feb. 20, 2018, pp. 1-3. Publisher: Pepper Hamilton LLC.

Intellectual Property Office of Singapore, "Examination Report from SG Application No. 11201706289W dated Mar. 5, 2019", from Foreign Counterpart to U.S. Appl. No. 15/017,359, pp. 1-5, Published: SG.

Intellectual Property Office of Singapore, "Invitation to Respond to Written Opinion from SG Application No. 11201708960W dated Jun. 11, 2018", from Foreign Counterpart of U.S. Appl. No. 15/141,582, pp. 1-7, Jun. 11, 2018; Published: SG.

Intellectual Property Office, of Singapore, "Written Opinion from SG Application No. 11201709186S dated Jul. 23, 2018", from Foreign Counterpart to U.S. Appl. No. 15/164,341, pp. 1-6, Published: SG.

International Bureau, "International Preliminary Report on Patentability from PCT Application No. PCT/US2016/034130 dated Dec. 7, 2017", from Foreign Counterpart to U.S. Appl. No. 15/164,341, pp. 1-7, Published: WO.

(56) References Cited

OTHER PUBLICATIONS

International Searching Authority, "International Search Report and Written Opinion from PCT Application No. PCT/US2016/016845 dated Nov. 23, 2016", from Foreign Counterpart to U.S. Appl. No. 15/017,359, pp. 1-14, Published: WO.

International Searching Authority, "Notice of International Preliminary Report on Patentability from PCT Application No. PCT/US2016/016845 dated Aug. 24, 2017", from Foreign Counterpart to U.S. Appl. No. 15/017,359, pp. 1-10, Published: WO.

Marcogliese et al, "Bitcoins and Blockchain—The Use of Distributed Ledger Technology for the Issuance of Digital Securities", "Cleary M & A and Corporate Governance Watch, Mergers and Acquisitions, Corporate Governance, Shareholder Activism", "Posted in SEC Guidance", "https://www.clearymawatch.com/2016/01/bitcoins-and-blockchain-the-use-of-distributed-ledger-technology-for-the-issuance-of-digital-securities/", Dated Jan. 4, 2016, Retrieved on Feb. 20, 2018, pp. 1-7. Publisher: Cleary Gottlieb Steen & Hamilton LLP.

Metz, "SEC Approves Plan to Issue Stock Via Bitcoin's Blockchain", "Wired, Business", "https://www.wired.com/2015/12/sec-approves-plan-to-issue-company-stock-via-the-bitcoin-blockchain/", Dated Dec. 15, 2016, Retrieved on Mar. 27, 2018, pp. 1-7.

Nitchman, "First Public Offering Using Blockchain Planned", "XBRL", "https://www.xbrl.org/first-public-offering-using-blockchain-planned/", Posted on Mar. 18, 2016, Retrieved on Feb. 20, 2018, pp. 1-3, Publisher: XBRL International Inc.

Prisco, "Overstock Files Crypto Stock Exchange Prospectus with the SEC", "Bitcoin Magazine", "https://bitcoinmagazine.com/articles/overstock-files-crypto-stock-exchange-prospectus-sec-1430258150/", Dated Apr. 28, 2015, Retrieved on Feb. 20, 2018, pp. 1-5.

Richards, "Wall Street Left Out in Overstock's US $500M Stocks Issue", "CoinTelegraph", "https://cointelegraph.com/news/wall-street-left-out-in-overstocks-us500m-stocks-issue", Dated Apr. 28, 2015, Retrieved on Feb. 20, 2018, pp. 1-4, Publisher: Cointelegraph.

Zacks, "MasterCard (MA) Files for Blockchain Patents, Introduces AI", "Zacks Equity Research", "https://www.yahoo.com/news/mastercard-ma-files-blockchain-patents-151203016.html", Dated Dec. 1, 2016, Retrieved on Feb. 20, 2018, pp. 1-8.

U.S. Patent and Trademark Office, "Notice of Allowance", U.S. Appl. No. 15/017,359, dated Aug. 13, 2018, pp. 1-37, Published: US.

U.S. Patent and Trademark Office, "Office Action", U.S. Appl. No. 15/017,359, dated Dec. 12 2017, pp. 1-42, Published: US.

U.S. Patent and Trademark Office, "Third-Party Submission Under 37 CFR 1.290 Concise Description of Relevance", U.S. Appl. No. 15/396,030, dated May 30, 2017, pp. 1-192, Published: US.

Vakta et al., "Blockchain Disruption in Security Issuance", "CAPGEMINI", "https://www.capgemini.com/wp-content/uploads/2017/07/blockchain_securities_issuance_v6_web.pdf", Dated Jul. 12, 2017, Retrieved Mar. 27, 2018, pp. 1-16.

Van Eyk, "Overstock.com Seeks to Build New Stock Market", "Bitcoin Magazine", "https://bitcoinmagazine.com/articles/overstock-com-seeks-build-new-stock-market-1412623808/", Dated Oct. 6, 2014, Retrieved on Feb. 20, 2018, pp. 1-5.

Intellectual Property Office of Singapore, "Invitation to Respond to Written Opinion from SG Application No. 11201706289W dated Apr. 16, 2018", from Foreign Counterpart to U.S. Appl. No. 15/017,359, pp. 1-6, Published: SG.

* cited by examiner

OBFUSCATION OF INTENT IN TRANSACTIONS USING CRYPTOGRAPHIC TECHNIQUES

CROSS-REFERENCE TO RELATED APPLICATIONS

This application claims the benefit of U.S. Provisional Application No. 62/166,515, filed on May 26, 2015, entitled "OBFUSCATION OF INTENT IN TRANSACTIONS USING CRYPTOGRAPHIC TECHNIQUES," which is hereby incorporated by reference for all purposes in its entirety.

TECHNICAL FIELD

Various embodiments of the present disclosure generally relate to transactions. More specifically, various embodiments of the present disclosure relate to systems and methods of obscuring intent in transactions using distributed and cryptographic ("crypto") techniques.

BACKGROUND

Front-running is an investing strategy that anticipates the impact of upcoming trades on the price of a security and uses such information to influence the price of the security. In front-running, a trader will take a position in a security just before another trader takes a position that will cause the stock to move in a predictable way. An example of front-running occurs when an individual trader buys shares of a stock just before a large institutional order for the stock, causing a rapid increase in the stock's price. Information regarding the institutional order can be obtained by monitoring the bids and asks on the market. For example, when an order is only partially filled on one exchange, a trader's intent for the trades on the other exchanges can be revealed, allowing other investors to use such information to make a profit based on the predictable effect of a certain transaction on the price of a stock.

The present technology overcomes this and other limitations of existing trading systems and provides other benefits as will become clearer to those skilled in the art from the following description.

BRIEF DESCRIPTION OF THE DRAWINGS

Embodiments of the present disclosure will be described and explained through the use of the accompanying drawings in which.

DETAILED DESCRIPTION

Figure 1:
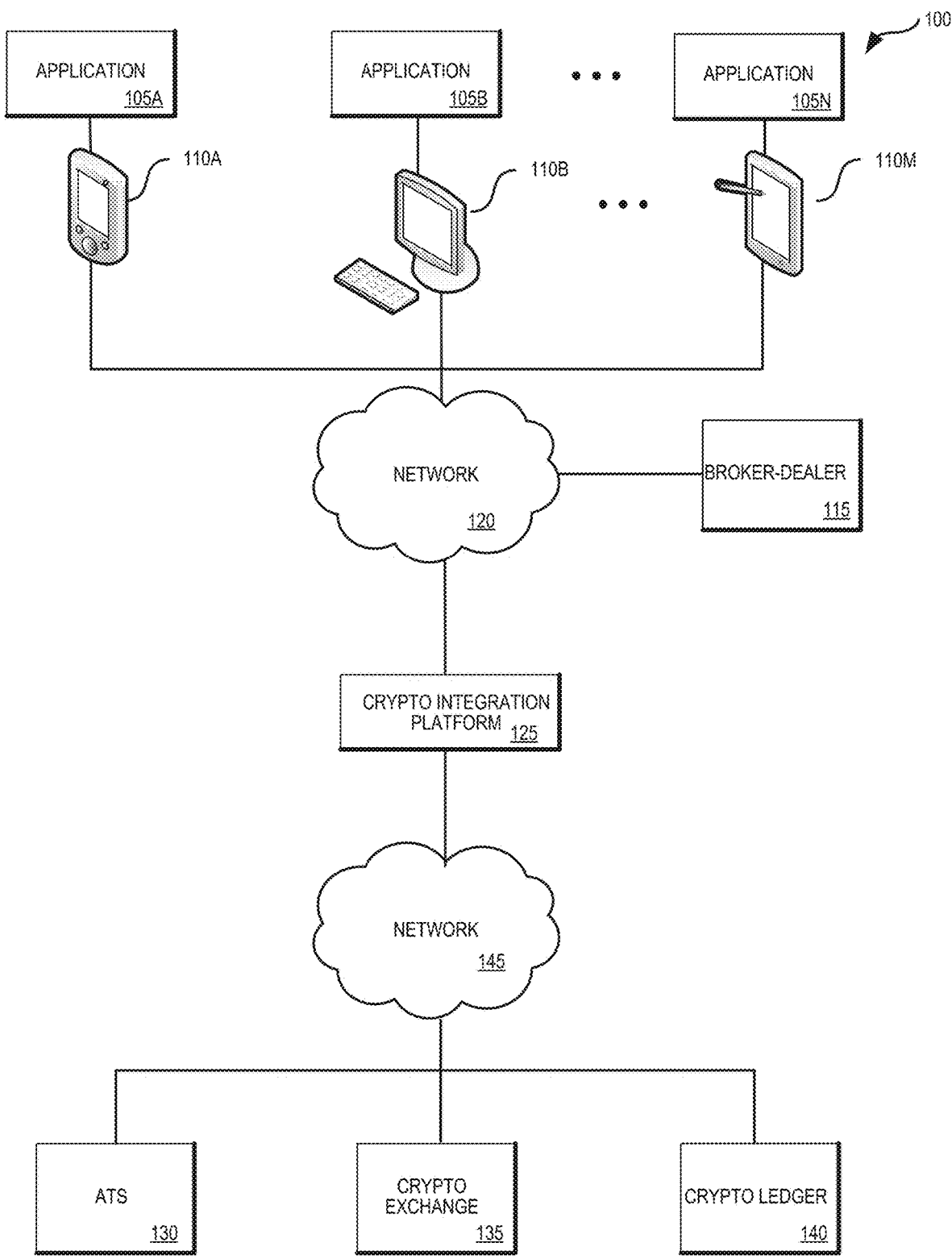
FIG. 1 illustrates an example of a network-based operating environment in accordance with various embodiments of the disclosure.

Various embodiments of the present disclosure generally relate to transactions to buy and sell securities. More specifically, various embodiments of the present disclosure relate to systems and methods of obscuring intent of an order to buy or sell digital transactional items using distributed and cryptographic ("crypto") techniques.

Today, multiple exchanges such as cryptographic exchanges ("crypto exchanges") and Alternative Trading Systems ("ATSs") trade the same security. When orders are only partially filled on one exchange because the order is large and/or because the security is not typically traded in high volume, a trader's intent for the trade on the other exchanges can be revealed before execution, that is, completion of the transaction. Such information can be used nefariously by others to influence the price of the security (i.e., front-running). For example, high frequency trading platforms (i.e., a program trading platform that uses powerful computers to transact large numbers of orders at fast speeds) use complex algorithms to analyze multiple markets and execute orders based on market conditions. These algorithms are designed to watch for signals regarding orders in one exchange and then race to the next exchange before the order is fulfilled to buy or sell the security, thereby influencing the price of the security. Typically, the traders using computers with the fastest execution speeds are more profitable than traders using computers with slower execution speeds.

The effects of front-running and high frequency trading are exemplified when the trading systems are slower. Trading systems that use a ledger or block chain to record transactions depend on a distributed network of nodes. The distributed network of nodes communicate with a ledger or block chain which can be slow, leaving investors vulnerable to exploitation of the publicly available intent of their order pre-execution.

Thus, current systems have the following challenges: (1) when information about an order is available, traders may attempt to influence the market price and (2) because order priority is determined by receipt of the orders at the exchange rather than at creation of the order, an environment where traders who can afford the best hardware and who can locate their algorithms closest to the exchange can obtain a position in front of orders that were submitted prior to their orders, which creates an unfair advantage.

Current solutions to prevent front-running (e.g., dark pools) are inadequate. Dark pools are electronic ATSs, similar to stock exchanges where trades can be matched. Unlike stock exchanges, orders in the dark pools are "dark," meaning that the size and price of the orders are not revealed to other participants. However, the dark pools simply limit visibility into the orders rather than disguise the information (e.g., the owners of the dark pools still have visibility). The lack of transparency makes dark pools vulnerable to potential conflicts of interest by their owners and predatory trading practices by some high-frequency traders.

Methods and systems described herein prevent traders from using hardware and software solutions that allow traders to use information nefariously because the information is not obfuscated. As described herein, using a series of cryptographic key pairs, one side of a transaction can be created, matched, and executed while a public record is recorded and maintained but obfuscated (i.e., not publicly transparent) until after the transaction is completed. A distributed ledger can record and assign priority of orders. For purposes of this disclosure, "obfuscating/obscuring order intent," "obfuscating/obscuring intent of an order," "obfuscating/obscuring intent" and the like means obfuscating information about an order so that one cannot derive the trader's intent.

Orders for trading digital transactional items (e.g., digital assets, digital liabilities, commodities, digital securities, digital interests in securities, crypto currencies, digital representations of funds such as tokens, cash, cash equivalents) traded on a cryptographic ("crypto") exchange (i.e., an exchange that trades digital transactional items) may be received into a legacy system and processed by an integration system and trading platform such as a Crypto Integration Platform. The Crypto Integration Platform, among other things, allows broker-dealers to open legacy trading systems to crypto exchanges (i.e., an exchange that trades digital transactional items) and allows securities issuers to conduct public offerings of securities and the general public to trade those securities in secondary market transactions. In doing so, the Crypto Integration Platform takes messages (e.g., orders) using protocols for trading and communicating between broker-dealers, ATSs, and exchanges (e.g., the Financial Information eXchange protocol ("FIX")) and transforms the messages so that the trade can be consummated using cryptographic techniques. For example, the Crypto Integration Platform receives orders to trade digital transactional items from broker-dealers and translates the orders into crypto orders.

The digital transactional items traded via trading systems such as crypto exchanges and ATSs may be transferred to other owners using cryptographic techniques such as public-key cryptography and bidirectional encryption. Public-key cryptography requires a key pair, where the two keys are mathematically linked. One key is a public key that is freely shared among nodes in a peer-to-peer network. The other key is a private key that is not shared with the public. The public key is used to encrypt plaintext and to verify a digital signature. The private key is used to decrypt cipher text and to digitally sign transactions. Transaction messages may be digitally signed by the sender's private key to authenticate the sender's identity. Then, the sender's digitally-signed transaction message may be decrypted using the sender's public key to verify that the sender originated the transaction.

Ownership of the digital transactional items may be based on ownership entries in distributed ledgers that are maintained by network nodes. The distributed ledgers (e.g., block chain for Bitcoin) record entries for each change of ownership of each digital transactional item and may be mathematically linked to the key pairs. To sell a digital asset or digital liability, a transaction message (e.g., in packets or other data structures) may be broadcast to nodes on a peer-to-peer network. The transaction message can be signed by the seller's private key and may include information such as a history of the chain of title of the digital asset or digital liability, the number of shares or items being transferred and the purchaser's public key-based address. When a majority of the nodes in the network agree that the sender has the proper chain of title, ownership is changed to the purchaser and the ledger is updated to indicate the transaction. Before a digital transactional item is sold or ordered, the buyer or seller may wish to keep the transaction a secret to prevent others from using information that may influence the price of the digital transactional item.

In implementations of the technology described herein, at least three key pairs are relevant and are associated with the following three addressed accounts: the customer portfolio account, which is controlled by the Crypto Integration Platform; the customer committed account, which is controlled by one or more trading systems (e.g., exchanges, ATSs); and the broker-dealer key pair, which is controlled by the Crypto Integration Platform. Generally, digital transactional items owned by the customer and not committed to an order are associated with the customer portfolio account. Digital transactional items committed to orders and committed order transactions are associated with the customer committed account, such that the customer committed account acts like an escrow. Non-committed orders are associated with the broker-dealer account. Each of these accounts are used to trade digital transactional items and more particularly to obfuscate intent of an order while trading digital transactional items. For purposes of this disclosure "addressed account" means the same as "digital account," "digital wallet," "registry," "customer portfolio/committed wallet," and "wallet."

In embodiments of the disclosure, an order to trade digital transactional items on a trading system such as an ATS or a crypto exchange from broker-dealers is received. The order can be received from a broker-dealer by a trading platform such as the Crypto Integration Platform.

When a transaction is received by the Crypto Integration Platform, the Crypto Trading Platform can check a balance of the customer's portfolio account recorded on a distributed ledger to ensure that the digital transactional items are associated with the customer's portfolio account. If the digital transactional items involved in the transaction are associated with the customer's portfolio account, the Crypto Integration Platform can cryptographically sign a transaction to transfer the digital transactional items associated with the trade into a customer committed account using a private key of the customer's portfolio account, creating a commit transaction. As discussed, the customer committed account is controlled by the trading system.

Then, the Crypto Integration Platform further creates a committed order transaction that includes data from the order and references the commit transaction. The Crypto Integration Platform encrypts the transaction with the public key of the trading system. The order, including a reference to the committed transaction, is recorded on a distributed ledger. Encrypting the order and publishing it to the distributed ledger results in the order being obfuscated except to the exchange—that is, the public can see that there is an order but cannot see the contents of the order. In some embodiments, the order is signed with the broker-dealer's private key (i.e., authorizing the transaction), which can be used by the trading system to ensure that the order was authorized. The distributed ledger may assign a priority to the order based on the time the order was received by the trading system. In other implementations, the distributed ledger can assign a priority based on the time the order was received by the broker-dealer.

Once the trading system receives the encrypted order, the trading system decrypts the order data using the trading system's private key and can validate the broker-dealer's signature using the broker-dealer's public key (if relevant). When a potentially matching order has been located based on priority of the order, the trading system (or in some embodiments, the Crypto Integration Platform) verifies that the digital transactional items are available for trade and clears and settles the transaction instantaneously by placing the digital transactional items (e.g., funds, digital assets/liabilities) into corresponding customer portfolio accounts. After the order has been executed, the details of the order are made public. Third parties can validate the executed order by using the trading system's public key to re-encrypt the executed order and comparing the re-encrypted order to the original order. In some embodiments, orders can be partially filled. While the details of the executed transaction can be made public after execution, details of the order intent (i.e., the remaining portion of the order yet to be filled) will not be made public until the ATS/exchange receives a message that the entire order has been filled.

Benefits of obscuring intent of the order include elimination of front running and high-frequency trading. An additional benefit is creation of a record of the transactions that public parties can recreate from the ledger after the orders have been executed. In current systems, traders rely on a data source within the trading system to maintain the orders. Should a trading system fail, orders would be lost. However, using methods and systems described herein, the orders are recorded on the distributed ledgers, providing a record of the orders. Moreover, cryptographically signing the transactions ensures authentication, authorization, and provenance.

Although this disclosure primarily discusses using the techniques described herein in trading digital transactional items, the techniques described herein can be used in other contexts in which intent for a transaction should be discrete until the transaction is completed. For example, methods and systems described herein may be used to obfuscate auction bids until the auction is completed. Additionally, systems that provide gambling services may use the techniques described to obfuscate information such as bets or lottery numbers.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Where context permits, words using the singular or plural form may also include the plural or singular form, respectively, and for the sake of brevity are not distinguished in the text.

FIG. 1 illustrates an example of a network-based operating environment 100 in which some embodiments of the present disclosure may be used. As illustrated in FIG. 1, operating environment 100 includes applications 105A-105N running on one or more computing devices 110A-110M (such as a mobile device, a mobile phone, a tablet computer, a mobile media device, a mobile gaming device, a vehicle-based computer, a dedicated terminal, a public terminal, desktop, or laptop computer, a kiosk, etc.). In some embodiments, applications 105A-105N for carrying out operations such as generating orders and checking account balances may be stored on the computing devices or may be stored remotely. These computing devices can include mechanisms for receiving and sending traffic by connecting through network 120 to the Crypto Integration Platform 125 and broker-dealer 115.

Computing devices 110A-110M are configured to communicate via network 120 with broker-dealer 115 and Crypto Integration Platform 125. In some embodiments, computing devices 110A-110M can retrieve or submit information to Crypto Integration Platform 125 and run one or more applications with customized content retrieved by Crypto Integration Platform 125 and broker-dealer 115. For example, computing devices 110A-110M each can execute a browser application or a customized client to enable interaction between the computing devices 110A-110M and the Crypto Integration Platform 125 and broker-dealer 115.

Broker-dealer 115 is an entity (i.e., natural persons, companies, or other organizations) that engages in the business of trading assets (e.g., securities, mutual fund shares, etc.) for its own account or on behalf of its customers. When executing trade orders on behalf of a customer, the entity acts as a broker. When executing trades for its own account, the entity acts as a dealer. Broker-dealer 115 may receive orders from computing devices 110A-110M or create their own orders. Broker-dealer 115 may communicate orders to the Crypto Integration Platform 125 via network 120. Each broker-dealer can have a key pair for signing messages. Such key pairs may be used by trading system such as ATS 130 or Crypto Exchange 135 to prove that the transaction was authorized by the broker-dealer (e.g., if the broker-dealer signs the transaction with its private key, ATS 130 or Crypto Exchange 135 can validate using the broker-dealer's public key). In some embodiments, broker-dealer 115 gives permission to the Crypto Integration Platform 125 to use the broker-dealer's 115 private key on behalf of the broker-dealer 115.

Figure 2:
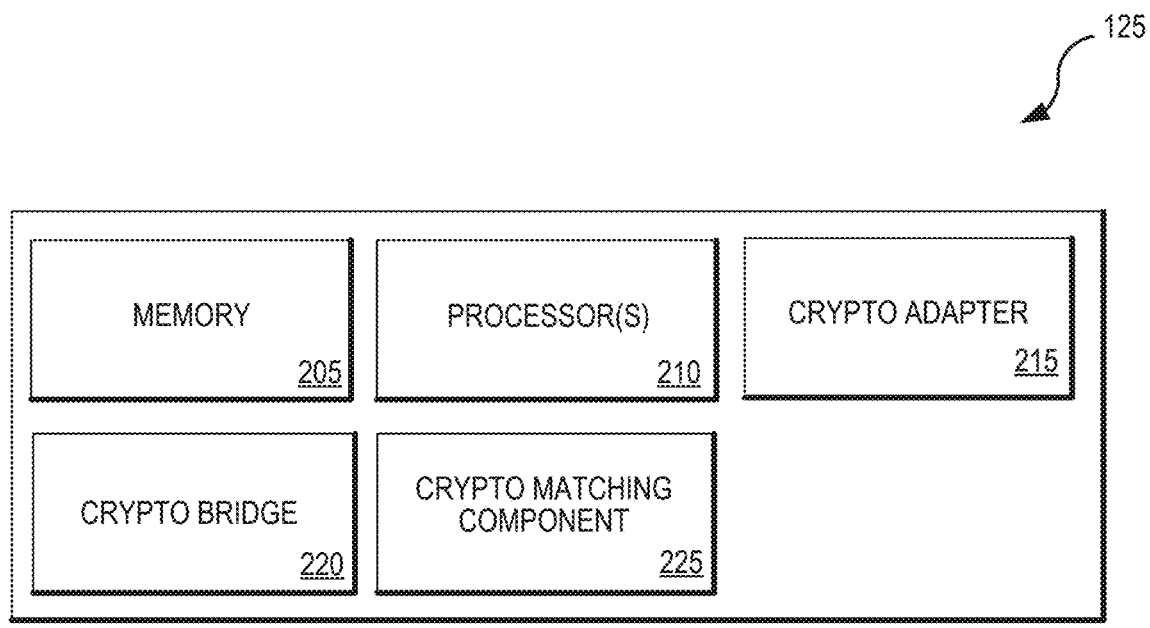
FIG. 2 illustrates a set of components in a Crypto Integration Platform according to one or more embodiments of the present disclosure.

The Crypto Integration Platform 125 can run on one or more servers and can be used to obfuscate orders and trade digital transactional items. In some embodiments, and as illustrated in FIG. 2, the Crypto Integration Platform 125 includes a Crypto Adapter 215, a Crypto Bridge 220, and a Crypto Matching Component 225. The Crypto Integration Platform 125 is communicably coupled with one or more ATS 130, Crypto Exchange 135, and Crypto Ledger 140 through network 145.

Network 120 and network 145 can be the same network or can be separate networks and can be any combination of local area and/or wide area networks, using wired and/or wireless communication systems. Either network 120 or network 145 could be or could use any or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 120 and network 145 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 120 and network 145 may be represented using technologies, languages and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

ATS 130 is a non-exchange trading system that finds interested parties for transactions by matching buyers and sellers. ATS 130 is an alternative to traditional stock exchanges. Examples of ATS 130 include electronic communication networks (ECNs), crossing networks, dark pools, and call markets. ATS 130 receives digitally signed orders from Crypto Integration Platform 125, finds potential buy/sell order matches to trade digital transactional items, and maintains a state of the order book which records the state of the orders.

Crypto Exchange 135 is an exchange that trade digital transactional items. Crypto Exchange 135 receives digitally signed crypto transactions (e.g., orders, cancellations) from the Crypto Integration Platform 125. In some embodiments, Crypto Exchange 135 can decrypt, match, and execute orders, including transferring digital transactional items to customers' portfolio accounts.

For purposes of this description, orders directed to trading systems can be obfuscated. Trading systems such as Crypto Exchange 135 and ATS 130 (referred to as "trading system," "ATS 130," "Crypto Exchange 135," "ATS," "crypto exchange," or "exchange") can participate in the crypto techniques described herein. ATS 130 has an associated key pair. The public key of the ATS 130's key pair is used by the Crypto Integration Platform 125, specifically the Crypto Bridge 220, to encrypt orders. In some embodiments, ATS 130 controls a key pair owned by a customer (the key pair for the customer committed wallet) which it uses to hold digital transactional items until an order has been completed. Additionally, in a preferred embodiment, ATS 130 has the public key for each authorized broker-dealer 115. Ownership of the digital transactional items in ATS 130 can be recorded on one or more distributed ledgers such as Crypto Ledger 140. ATS 130 can read an encrypted order from the ledger that references the committed transaction and can decrypt the order using its own private key. Also, if the transaction was signed by the broker-dealer's private key, ATS 130 may verify that the transaction is authorized by verifying the broker-dealer signature using the broker-dealer's public key.

In some embodiments, instead of multiple users' orders going to one exchange, there can be multiple matching ATSs 130 or Crypto Exchanges 135 that compete to match the transaction. Instead of being signed by the private key of one ATS or Crypto Exchange 135 to decrypt the order, the transactions can be decoded by one of "n" authorized parties.

Preferably, before the order is made public, the entire order should be filled. If the order spans multiple transactions (e.g., order was for 100 shares and it takes two transactions to fill the order), each transaction can reference the original order identifier. The ATS can keep track of the transaction identifiers via the matching component and the distributed ledger and detect that the order has been completely filled. After the order is filled, then the ATS can have the order intent published to the ledger.

Crypto Ledger 140 records economic transactions such as the sale of digital assets in exchange for funds. Crypto Ledgers 140 vary per unit. For example, Bitcoin uses a distributed public ledger called the block chain. When Crypto Ledger 140 receives a transaction signed with the proper key from Crypto Integration Platform 125 and the transaction is verified by network nodes, the Crypto Ledger 140 moves the assets to the proper addressed account (e.g., digital wallet) by recording the transaction (e.g., securing a transaction in a block to the block chain). Crypto Ledger 140 receives an order signed by the broker-dealer's private key and encrypted by Crypto Bridge 220 and then assigns an order of priority to the order based on a consensus algorithm.

Various data stores can be used to manage storage and access to digital securities, user information, and other data. The data stores may be distributed data stores such as Crypto Ledger 140. The data stores may be a data repository of a set of integrated objects that are modeled using classes defined in database schemas. Data stores may further include flat files that can store data. Crypto Integration Platform 125 and/or other servers may collect and/or access data from the data stores.

FIG. 2 illustrates a set of components within Crypto Integration Platform 125 according to one or more embodiments of the present disclosure. According to the embodiments shown in FIG. 2, Crypto Integration Platform 125 can include memory 205, one or more processor(s) 210, Crypto Adapter 215, Crypto Bridge 220, and Crypto Matching Component 225. Other embodiments may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, Crypto Bridge 220 and Crypto Matching Component 225 can be combined into a single component.

Memory 205 can be any device, mechanism, or populated data structure used for storing information. In accordance with some embodiments of the present disclosure, memory 205 can be or include, for example, any type of volatile memory, nonvolatile memory, and dynamic memory. For example, memory 205 can be random access memory, memory storage devices, optical memory devices, magnetic media, floppy disks, magnetic tapes, hard drives, erasable programmable read-only memories (EPROMs), electrically erasable programmable read-only memories (EEPROMs), compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of Crypto Adapter 215, Crypto Bridge 220, and Crypto Matching Component 225.

Crypto Adapter

Crypto Adapter 215 serves as the interface between broker-dealers and exchanges. Crypto Adapter 215 receives orders for trading digital assets from broker-dealer 115 and, in some embodiments, directly from computing devices 110A-110M. The orders are received by Crypto Adapter 215 in a conventional protocol/format commonly used by broker-dealer 115 (e.g., FIX messages). Crypto Adapter 215 translates the orders into cryptographic transactions. Crypto Adapter 215 communicates with Crypto Bridge 220 to provide market data to the broker-dealers from the exchanges. Crypto Adapter 215 also integrates new customers by storing a customer identifier provided by the broker-dealer and generating addressed accounts having two separate key pairs. The two key pairs are used to create two addressed accounts associated with the customer identifier.

Both addressed accounts represent digital accounts or digital wallets. The first addressed account, referred to as the customer portfolio wallet, customer portfolio account, or customer portfolio addressed account, stores digital transactional items that are not committed to a buy or sell order. In some embodiments, the customer associated with the customer identifier owns the key pair for the customer portfolio wallet but authorizes Crypto Adapter 215 to use the key pair for transactions. In other embodiments, Crypto Adapter 215 or a third party owns the customer portfolio wallet. The second addressed account, which may be referred to interchangeably as either the customer committed wallet, customer committed account, or the customer committed addressed account, stores digital transactional items that the customer has placed in buy or sell orders that have not yet been completed (e.g., "committed" assets or funds). In some embodiments, Crypto Adapter 215 either owns the keys for the customer committed wallet or is authorized to use the keys to the customer committed wallet. In some embodiments, the trading system controls the key to the customer committed wallet. In such cases, the trading system acts as an escrow account, where the funds or assets are controlled by a third party (the exchange) and when the terms of the agreement are reached, the digital transactional items are released to their new accounts.

Crypto Adapter 215 also controls a pair of keys for an addressed account associated with the broker-dealer. In some embodiments, the private key of the broker-dealer addressed account is used to sign the order. The exchange can later verify that the order is authentic by validating the broker-dealer's signature using the broker-dealer's public key.

Crypto Adapter 215 can receive an order message that includes a buy, sell, or cancel order associated with a customer identifier from a broker-dealer. If the order is a buy order, the order message indicates that the broker-dealer has funds for the transaction on deposit. Therefore, Crypto Adapter 215 issues a representation that cash from the customer is being held at the broker-dealer specifically to settle the trade (i.e., a digital liability, token, IOU from the broker-dealer). In some embodiments, the funds could be sent via a crypto currency transaction from an addressed account of a broker-dealer to the customer portfolio wallet.

Crypto Adapter 215 creates a commit transaction (i.e., a transaction to buy or sell digital transactional items on the ATS or crypto exchange) for the order which includes information for the transfer of digital transactional items from a source account (i.e., customer portfolio wallet) to a destination account (i.e., committed wallet) and signs the commit transaction with the private key of the customer portfolio wallet. The commit transaction may include a digital asset or token, the customer identifier, and/or the public key of the committed wallet. After the transaction is signed by the Crypto Adapter 215 and the ownership of the digital transactional items is verified by the network nodes, the transfer of the token to the customer committed wallet is completed and the committed transaction is created.

Crypto Adapter 215 further creates a committed order transaction that includes the order and references the commit transaction. Crypto Adapter 215 routes the committed transaction order to Crypto Bridge 220, which verifies the transaction and encrypts the order with the exchange's public key. Crypto Adapter 215 also creates and delivers execution reports to the broker-dealer informing the broker-dealer that the order is pending. Crypto Adapter 215 receives execution reports from the Crypto Matching Component 225 that Crypto Adapter 215 forwards to broker-dealers. In some embodiments, each broker-dealer 115 has a dedicated crypto adapter. Crypto Adapter 215 can further verify that an order has been executed by checking a distributed ledger to determine whether the digital transactional items involved in the order are associated with the customer portfolio account.

Crypto Bridge

Crypto Bridge 220 receives requests for market data on the exchanges from Crypto Adapter 215. Crypto Bridge 220 aggregates information from the crypto exchanges and serves as a router to locate the best price in the market for the security involved in the transaction. The Crypto Bridge 220 can aggregate the data by monitoring crypto ledgers to generate a current snapshot of the order book by subscribing to order information which is visible on the public ledger. Crypto Bridge 220 further provides a single interface for broker-dealers by monitoring different distributed ledgers, and maintaining the current state of market data across exchanges and distributed ledgers. The exchanges may have different distributed ledgers. For example, various distributed ledgers may be used, and these distributed ledgers may have different application programming interfaces with different associated keys. Crypto Bridge 220 accesses the data from all the distributed ledgers and provides the data to broker-dealers in one standard format. Such information is useful to an ATS to determine that an order has been filled, particularly when multiple exchanges are involved.

Crypto Bridge 220 receives orders from Crypto Adapter 215 and verifies that the orders are correct. Crypto Bridge 220 also encrypts the orders (which reference the committed transaction) with the public key of the exchange. More than one order can be included in a committed transaction so long as the total amount of the orders does not exceed the transaction amount. Generally, the transaction amount includes any fees payable at the time of order placement (e.g., commission, transaction fees). Crypto Bridge 220 then communicates with a distributed ledger to record the encrypted orders to the ledger.

Crypto Matching Component

Crypto Matching Component 225 receives a match request from an ATS or exchange that identifies two committed orders (i.e., orders in which the assets/funds have been transferred to the customer committed wallets) that are potentially a match. The match request includes the order identifiers for each committed transaction. Crypto Matching Component 225 maps the order identifiers to the customer committed wallet for each order. Crypto Matching Component 225 requests a balance of the committed wallets from the crypto ledger to ensure that from the selling side the digital asset is available and committed for the transaction, and from the buying side that the funds are available and committed for the transaction. Crypto Matching Component 225 matches the request response and includes the counterparty hashes. Crypto Matching Component 225 then settles and clears the transactions by deducting from the committed wallets and crediting the customer portfolio wallets for each party using the counterparty hashes.

Crypto Matching Component 225 can act as an order book for all of the orders on an exchange, recording the status of the orders (e.g., partially filled, completely filled, cancelled, expired). Crypto Matching Component 225 then records clear text execution reports to the ledger, and returns the execution reports to broker-dealer 115 in the existing broker-dealer's format. For example, after a transaction has been executed, Crypto Matching Component 225 (or an ATS/exchange) can record the transaction to the distributed ledger showing that X shares were bought for Y dollars. When Crypto Matching Component 225 has detected that an entire order has been filled, Crypto Matching Component 225 (or an ATS/exchange) records the order including the order intent to the distributed ledger. In some embodiments, the functions of Crypto Matching Component 225 may be completed by one or more ATSs or crypto exchanges and/or the Crypto Matching Component 225 may provide the order information to the ATS/exchange to record to the ledger.

Figure 3:
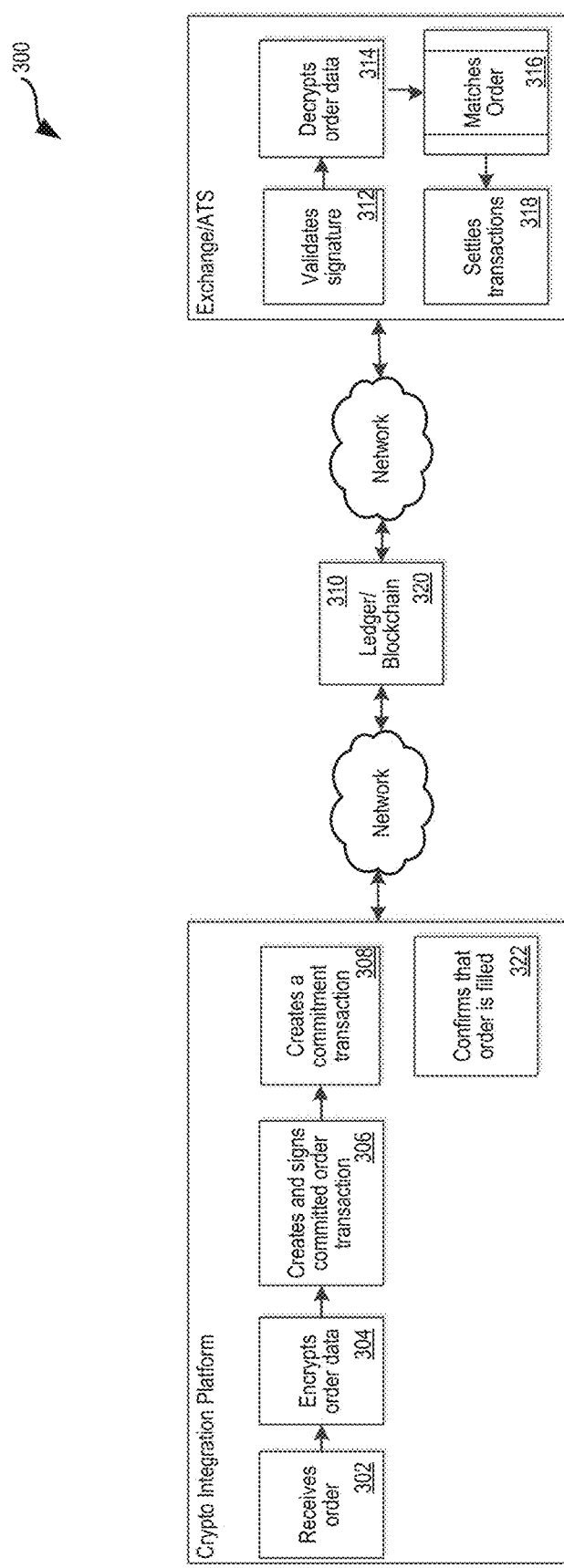
FIG. 3 illustrates a process of obfuscating an intent of an order until the order is executed in accordance with one or more embodiments of the present disclosure.

FIG. 3 illustrates a process of obfuscating an intent of an order until the order is executed. Receiving operation 302 receives an order from a broker-dealer to buy or sell one or more digital transactional items. Encrypting operation 304 encrypts the order data with a public key of a trading system. Crypto Integration Platform (or in some embodiments, the broker-dealer) creates a committed order transaction and signs the committed order transaction with a private key of the broker-dealer in creating operation 306. The committed order transaction can transfer the order to an exchange controlled committed wallet pending cancellation or settlement of the order. The committed order transaction, including the encrypted order data, is then recorded to the distributed ledger in recording operation 310. At this point, third parties (i.e., anyone without access to the exchange's private key) can see that there is a transaction but cannot see the details of the transaction. The distributed ledger can assign a priority to the order.

Next, the exchange may determine whether the order is authorized by validating the broker-dealer's signature using the broker-dealer's public key in validating operation 312. Decrypting operation 314 decrypts the order data using the private key of the exchange. Matching operation 316 matches orders in the priority assigned by the distributed ledger. Settling operation 318 settles the transaction and can include the counterparty hash and clear text order information. The transaction including the clear text (i.e., unencrypted, readable) order information is recorded to the ledger in recording operation 320 and published. In some embodiments, the clear text of the order is only published when a crypto matching component confirms that the entire order has been filled. The Crypto Integration Platform can confirm that the order has been filled (or partially filled) by reading or querying a distributed ledger to check the contents of the customer portfolio wallets in confirming operation 322.

Figure 4:
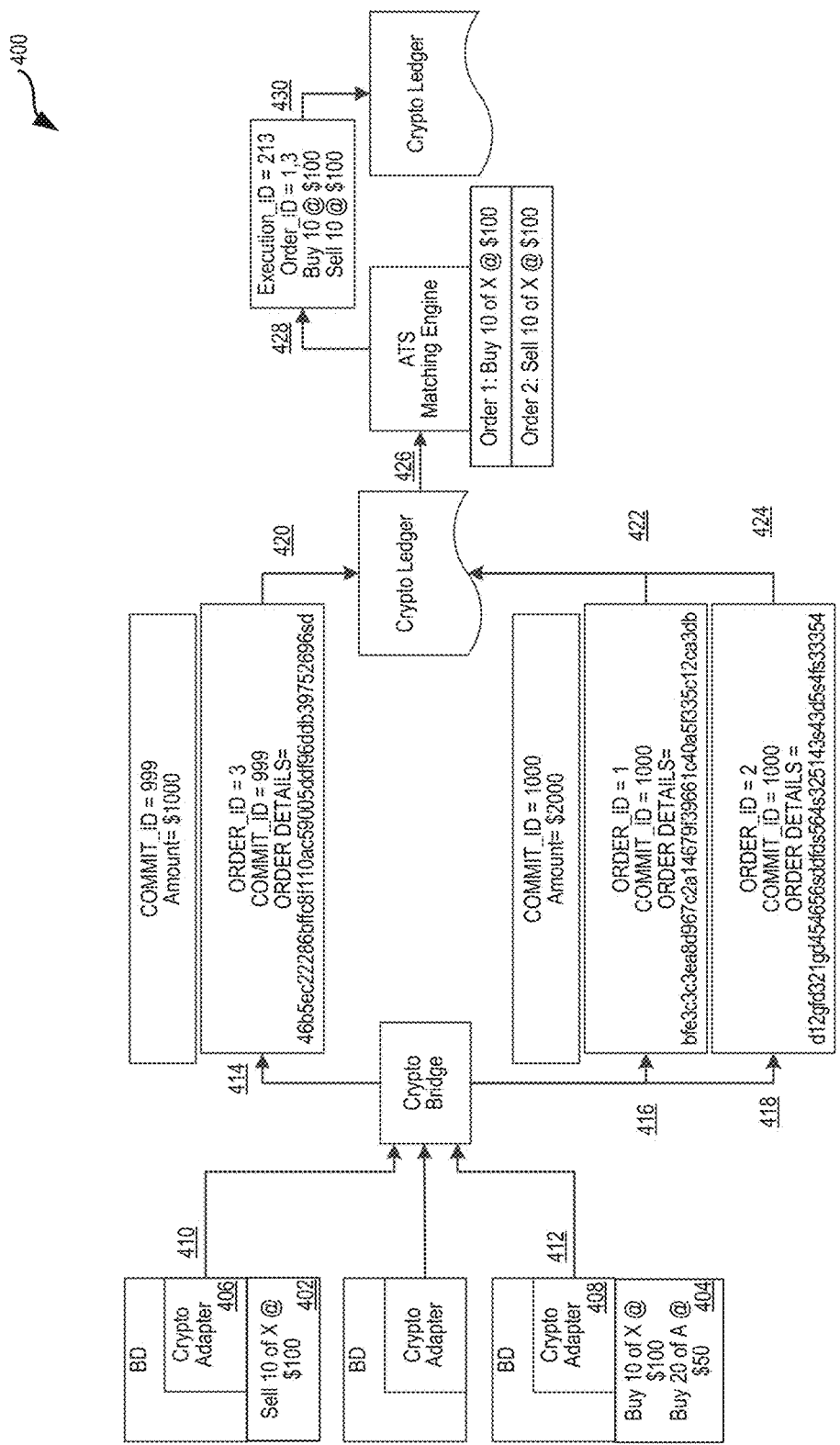
FIG. 4 diagrammatically illustrates a representative example of using a process of obfuscating an intent of an order until the order is executed in accordance with one or more embodiments of the present disclosure.

FIG. 4 diagrammatically illustrates a representative example 400 of using a process of obfuscating an intent of an order until the order is executed. For purposes of this example, assume a first customer submits an order to sell 10 shares of X at $100/share to a first broker-dealer (operation 402). A second customer submits another two orders, including an order to buy 10 shares of X at $100/share and an order to buy 20 shares of A at $50/share, to a second broker-dealer (operation 404).

In a preferred embodiment, the crypto adapters and the crypto bridge together create committed order transactions that are obfuscated until the transactions are complete. Generally, the crypto adapters create the transactions and the crypto bridge provides an interface between the crypto adapters and the crypto ledger.

The orders are sent to crypto adapters at the broker-dealers for processing (operations 406, 408). The crypto adapters translate the orders to cryptographic orders from a legacy protocol (e.g., FIX) by the crypto adapters at the broker-dealers. If the digital transactional items (e.g., digital assets for a sell order; funds/token/crypto currency for a buy order) are not already associated with the first and second customers' portfolio wallets, the crypto adapters (or the broker-dealers) transfer the digital transactional items to the respective customers' portfolio wallets from a different account (e.g., cryptographically using the broker-dealers' private key).

Next, the crypto adapters transfer the digital transactional items from the first and second customers' portfolio wallet into the first and second customers' committed wallets by signing committed order transactions with the respective customers' private key for the customers' portfolio wallet. Transferring the digital transactional items to the customer committed wallets ensures that the digital transactional items will not be used for other transactions. In some embodiments, prior to signing the committed transactions to transfer the digital transactional items to the customer committed wallets, the crypto adapters verify that the digital transactional items are in fact owned by the respective customers by confirming ownership with a crypto ledger (or distributed ledger).

Then, the crypto adapters create two committed order transactions (one for each customer): Commit_ID 999 and Commit_ID 1000. Commit_ID 999 includes the order to sell 10 shares of X at $100/share and Commit_ID 1000 includes the order to buy 10 shares of X at $100/share and the order to buy 20 shares of A at $50/share. Each committed order transaction can have more than one order associated with the committed order transaction so long as the total amount associated with orders does not exceed the amount of the committed order transaction (e.g., Order_ID=1 and Order_ID=2 are both associated with Commit_ID=1000, with a total amount of $2000). The committed order transactions include the order information and a reference to the transaction that transferred the digital transactional items into the customer committed wallets.

Next, the crypto adapters send the committed order transactions to the crypto bridge (operations 410, 412). The crypto bridge encrypts the order data with the public key of the exchange. In order to decrypt the order data, the private key of the exchange is required (operations 414, 416, 418). In some embodiments, multiple signatures could be used for multiple exchanges. For example, an order may be submitted to a network of exchanges such that any exchange may sign a transaction including the trader's committed assets. The first exchange that has a matching order would sign both transactions causing a successful execution.

Next, the crypto bridge signs the committed order transactions with a private key of the broker-dealer and references the public key of the exchange to associate the committed order transactions with the customer committed account, which is controlled by the exchange (operations 414, 416, 418). The encrypted orders (i.e., not decipherable) are written to the crypto ledger (operations 420, 422, 424). The crypto ledger assigns a priority of the orders as part of a consensus. At this point, the public can see that there are three orders, all of which have a priority on the ledger. However, the intention of those orders is obfuscated because the orders have been encrypted such that only the exchange can read the order.

Once the encrypted order is recorded onto the crypto ledger, the exchange reads the order from the ledger and decrypts the order with its private key (i.e., the orders were encrypted with the exchange's public key) (operation 426). The exchange can also verify the transaction by validating the broker-dealer's private key with the broker-dealer's public key. The exchange matches the orders based on their assigned priority (operation 428). In this example, the order to buy 10 shares of X at $100 is matched with the order to sell 10 shares of X at $100. The assets or funds in each of the customer committed wallets are transferred to the counterparty's customer portfolio wallet. Once the orders are executed, the order execution is written to the crypto ledger (i.e., 10 shares of X were bought for $100) with the execution details in clear text (i.e., the order execution can be publicly viewed) (operation 430). However, in some implementations, even if the transaction is written to the ledger, the order intent is not written to the ledger until the entire order is filled. Thus, if half of an order is filled prior to the other half of the order being filled, the order is not published until the ATS/exchange (e.g., via the matching component) determines that the entire order is filled, or in some cases, cancelled or expired. Each transaction or part of the order can reference the original order identifier. Once the exchange determines that the entire order is filled, the order is published in clear text. In some embodiments, a transaction identifier of a later executed transaction can be chained together with the first transaction identifier. Then, the order intent publishes at the end of the chain.

The matching component can keep track of all the orders that are incoming to an exchange and match buy orders with sell orders. The matching component can maintain an order book which keeps track of the status of orders (e.g., open, closed, expired, cancelled). When a portion of an order is matched by the matching component, the matching component reports to the exchange so that the transaction can be recorded to the distributed ledger. However, the order intent of an order is not published until the order is entirely filled. The matching component determines when an order is closed—that is, when an order is either cancelled or completely filled and sends a message to the exchange so the exchange can record the order intent to the distributed ledger.

In a non-limiting example, a buy order of 10 ABC shares for price X can be matched with a sell order of 5 ABC shares for price X. Once the matching component matches these two orders (even though the buy order is only partially filled), the transaction can be sent to the exchange and the exchange can record the completed order to the distributed ledger showing that 5 shares of ABC have been purchased for price X. The matching component can determine that the entire sell order has been filled and thus inform the exchange that the order intent of the sell order can be published to the ledger in clear text. However, the matching component does not inform the exchange that the buy order is filled because the buy order has an outstanding portion of the order to purchase 5 remaining shares of ABC at price X. Thus, at this point, the order intent of the buy order is not published. Once the matching component matches another sell order with the remaining portion of the buy order and detects that the entire buy order is filled, the matching component can inform the exchange that the buy order is filled. Then, the exchange can request that the order intent be published to the distributed ledger in clear text. Thus, in this example, order intent is published only after an entire order is filled. This example includes a buy order that is filled with two transactions; however, an order can be filled using more than two transactions. The same concepts can apply to an order that is filled using more than two transactions.

Typically, each exchange has its own matching component. In some embodiments, different rules can apply to each matching component (e.g., first order received sets price vs. sell order sets price vs. buy order sets price). An order can be distributed to and filled by numerous exchanges. To ensure that the order has not been filled or partially filled by another exchange, prior to executing a matched order, the exchange could put the order in a temporary state while checking the distributed ledger (i.e., a single source of truth) to ensure that the order had not been filled or partially filled by another exchange (i.e., to ensure that the digital transactional items to be traded are still in the expected addressed account).

Figure 5:
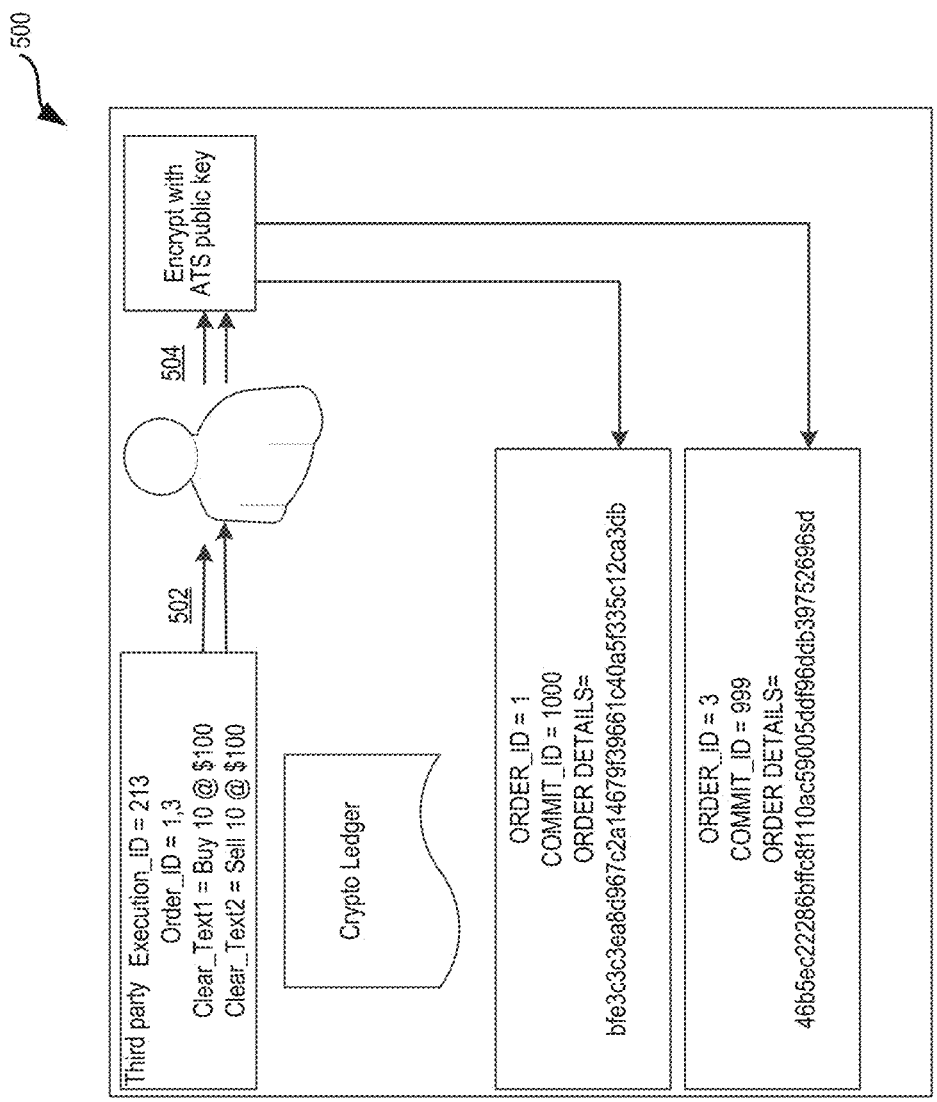
FIG. 5 diagrammatically illustrates a representative example of a process for a third party verifying an order intent and priority in accordance with one or more embodiments of the present disclosure.

FIG. 5 diagrammatically illustrates a representative example 500 of a process for a third party verifying an order intent and priority. The third party can view the execution reports because they are written in clear text (i.e., the third party can see that there was a buy order of 10 shares of X at $100 and a sell order to sell 10 shares of X at $100) (operation 502). Additionally, the third party can take the execution transaction and re-encrypt it with the exchange public key (operation 504). If the execution transaction encrypted with the exchange public key is the same as the committed transaction order, then the third party can be assured that the orders were the same. Thus, this verification process mathematically proves that the clear text on the final ledger transaction is equal to the encoded value on the order transaction.

Figure 6:
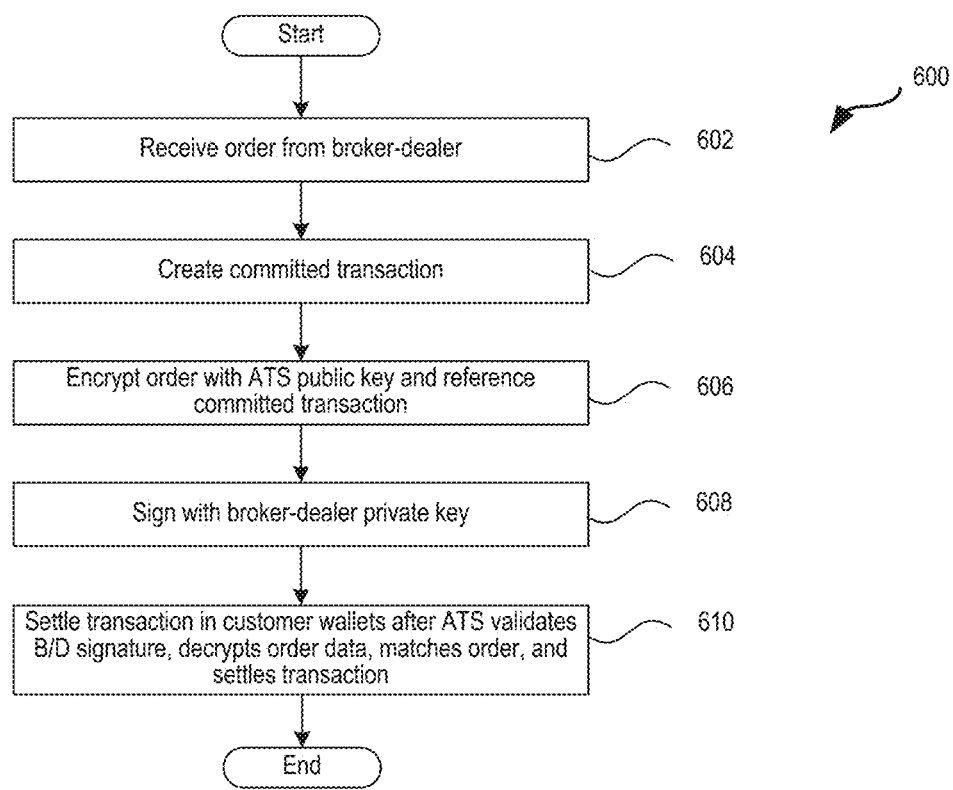
FIG. 6 is a flowchart illustrating a process for obfuscating the intent of orders until the order is executed in accordance with one or more embodiments of the present disclosure.

FIG. 6 is a flowchart illustrating a process 600 for obfuscating the intent of orders until the order is executed. In some embodiments, various components of the Crypto Integration Platform can perform these operations. In some embodiments, some or all of these operations can be performed. In some embodiments, some or all of these operations can be performed in a different order or in parallel. In receiving operation 602, an order is received from a broker-dealer. In creating operation 604, a committed order transaction is created, which places the order into a pending state. In encrypting operation 606, the committed order transaction, is encrypted with a public key of the exchange. In signing operation 608, the order is signed with the broker-dealer's private key. In settling operation 610, after the order is decrypted, validated by the exchange, and matched in its assigned priority, the transaction is settled by placing custody of the funds and assets in the appropriate customer's wallet and publishing the execution record to the ledger in a non-obfuscated manner.

Figure 7:
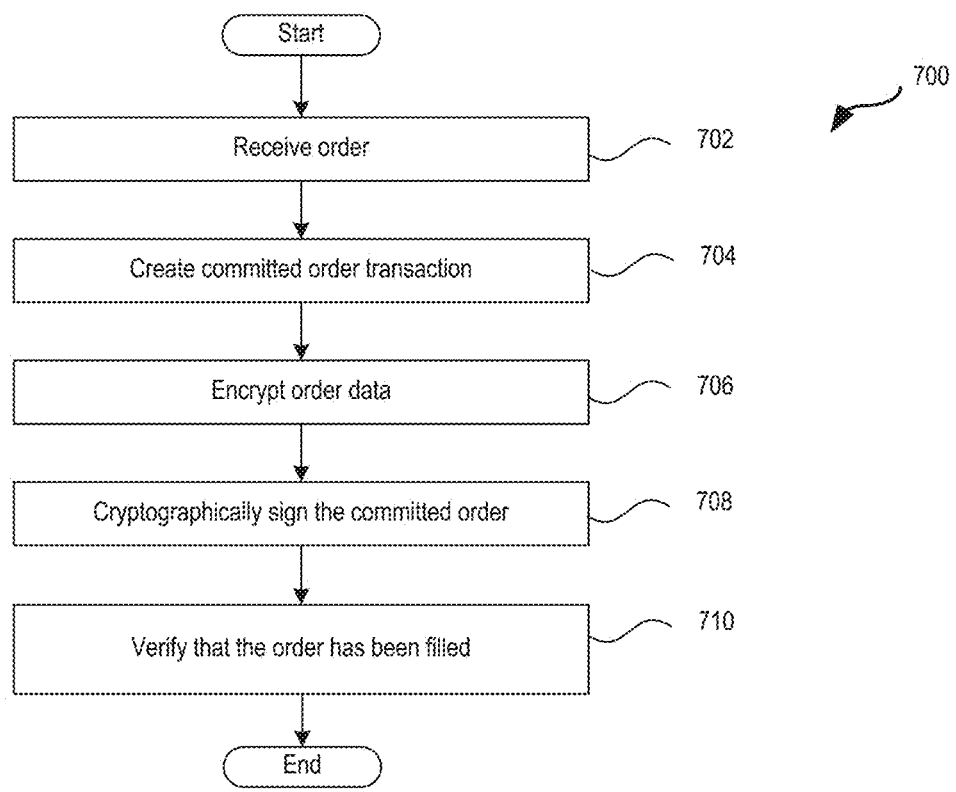
FIG. 7 is a flowchart illustrating, from the perspective of a crypto integration platform, a process for obfuscating an intent of an order until the order is executed in accordance with one or more embodiments of the present disclosure.

FIG. 7 is a flowchart illustrating, from the perspective of a crypto integration platform, a process 700 for obfuscating an intent of an order until the order is executed. Receiving operation 702 receives an order to trade a digital transactional item in exchange for other digital transactional items through a trading system. Creating operation 704 creates a committed order transaction that identifies data associated with the order. Encrypting operation 706 encrypts the data associated with the order. This may be done with a credential of a first addressed account. The first addressed account can be a customer committed account and first addressed account credentials may be controlled by the trading system.

Cryptographically signing operation 708 signs the committed order transaction with a credential associated with a second addressed account. The second addressed account can be a broker-dealer account. Verifying operation 710 verifies that the order has been filled by checking a record on a distributed ledger. The record can be recorded in an unencrypted format and includes transaction data (and order data) of one or more transactions that have been executed to fill the order. Such data is not recorded to the ledger in an unencrypted format until the order has been filled, which could take numerous transactions, depending on the size of the order and how frequently trades for the security occur.

Figure 8:
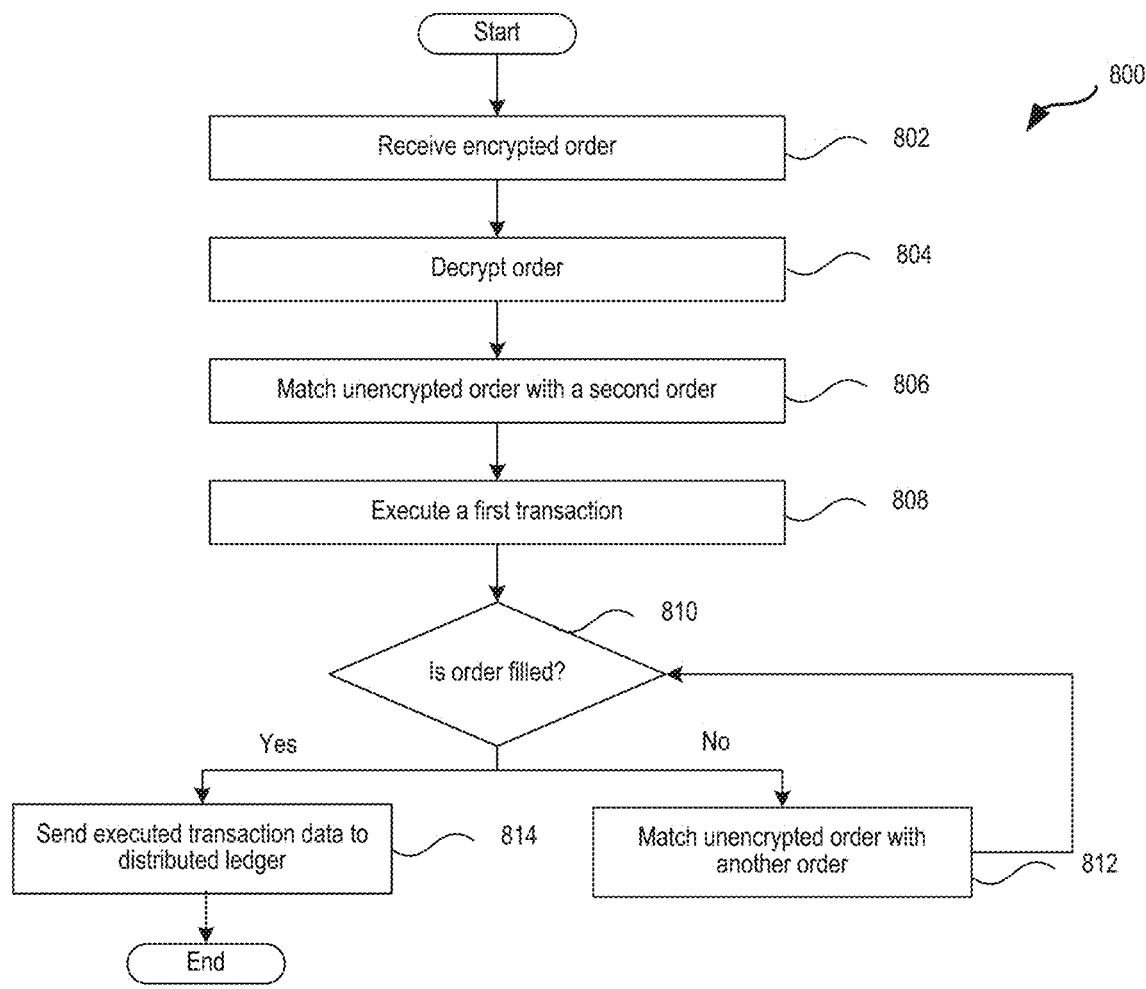
FIG. 8 is a flowchart illustrating, from the perspective of a trading system, a process for obfuscating an intent of an order until the order is executed in accordance with one or more embodiments of the present disclosure.

FIG. 8 is a flowchart illustrating, from the perspective of a trading system, a process 800 for obfuscating an intent of an order until the order is executed. Receiving operation 802 receives an encrypted order to trade digital transactional items. Decrypting operation 804 decrypts the order using a credential associated with a first customer committed addressed account (e.g., a private key of the first customer committed addressed account). Matching operation 806 matches the unencrypted order with a second order to trade at least some of the digital transactional items. Executing operation 808 executes a trade by cryptographically transferring at least a portion of the digital transactional times from the first customer committed addressed account to a second customer's portfolio addressed account and cryptographically transferring at least a portion of other digital transactional items from the second customer's second customer committed addressed account to the first customer's portfolio addressed account.

Decision operation 810 determines whether the entire order has been filled. When the entire order has not been filled, decision operation 810 branches to matching operation 812 to match the order with a second order. Thereafter, decision operation 810 again determines when the entire order has been filled. When the entire order has been filled, decision operation 810 branches to sending operation 814 which sends the transaction data, including the order data and the trading data to be recorded to the distributed ledger in an unencrypted format. Using this method, third parties can verify the contents of the order and the trades but cannot use the information to influence the market.

Figure 9:
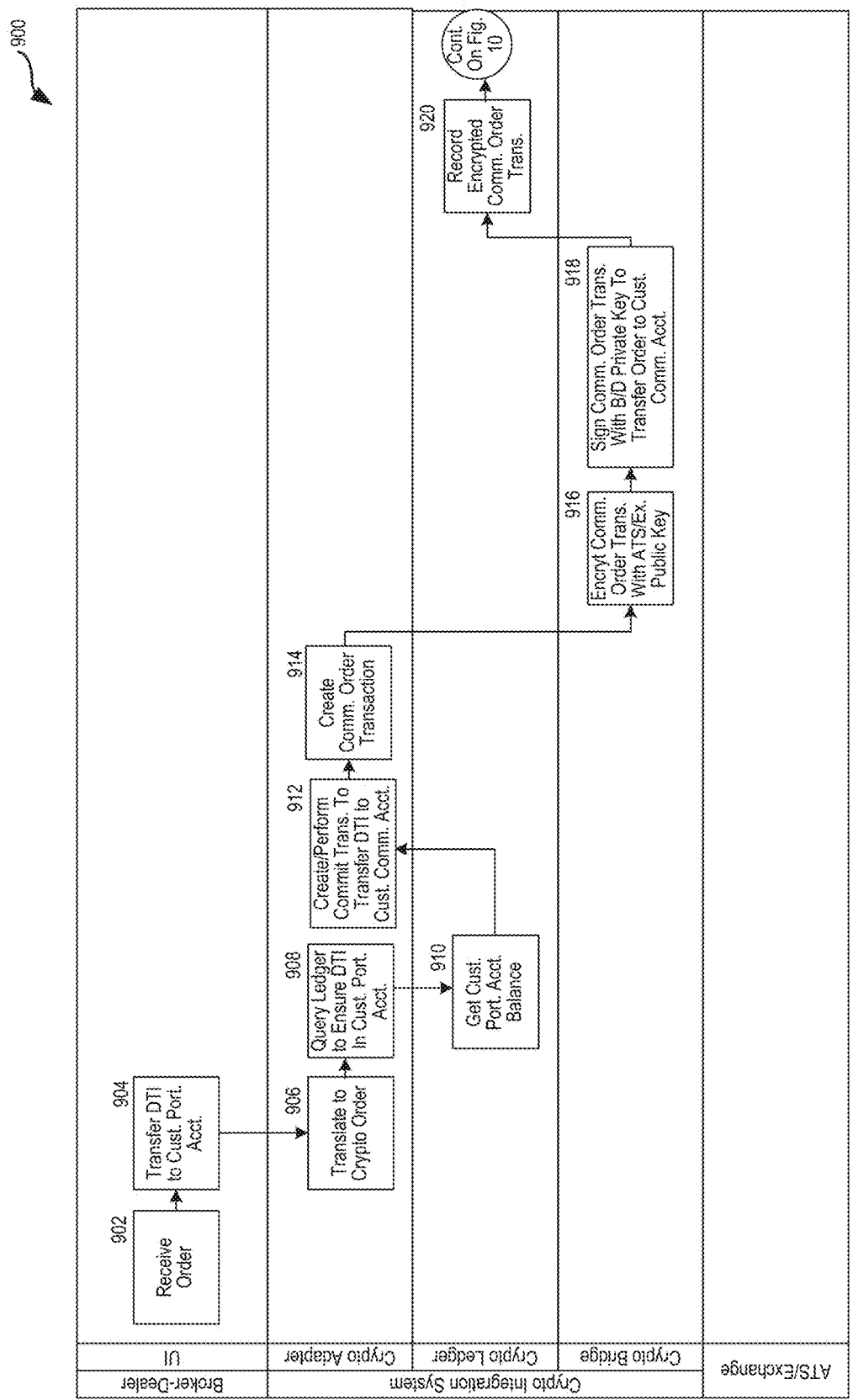
FIGS. 9-10 are diagrams collectively illustrating a process of obfuscating an intent of an order until the order is executed in accordance with one or more embodiments of the present disclosure.
Figure 10:
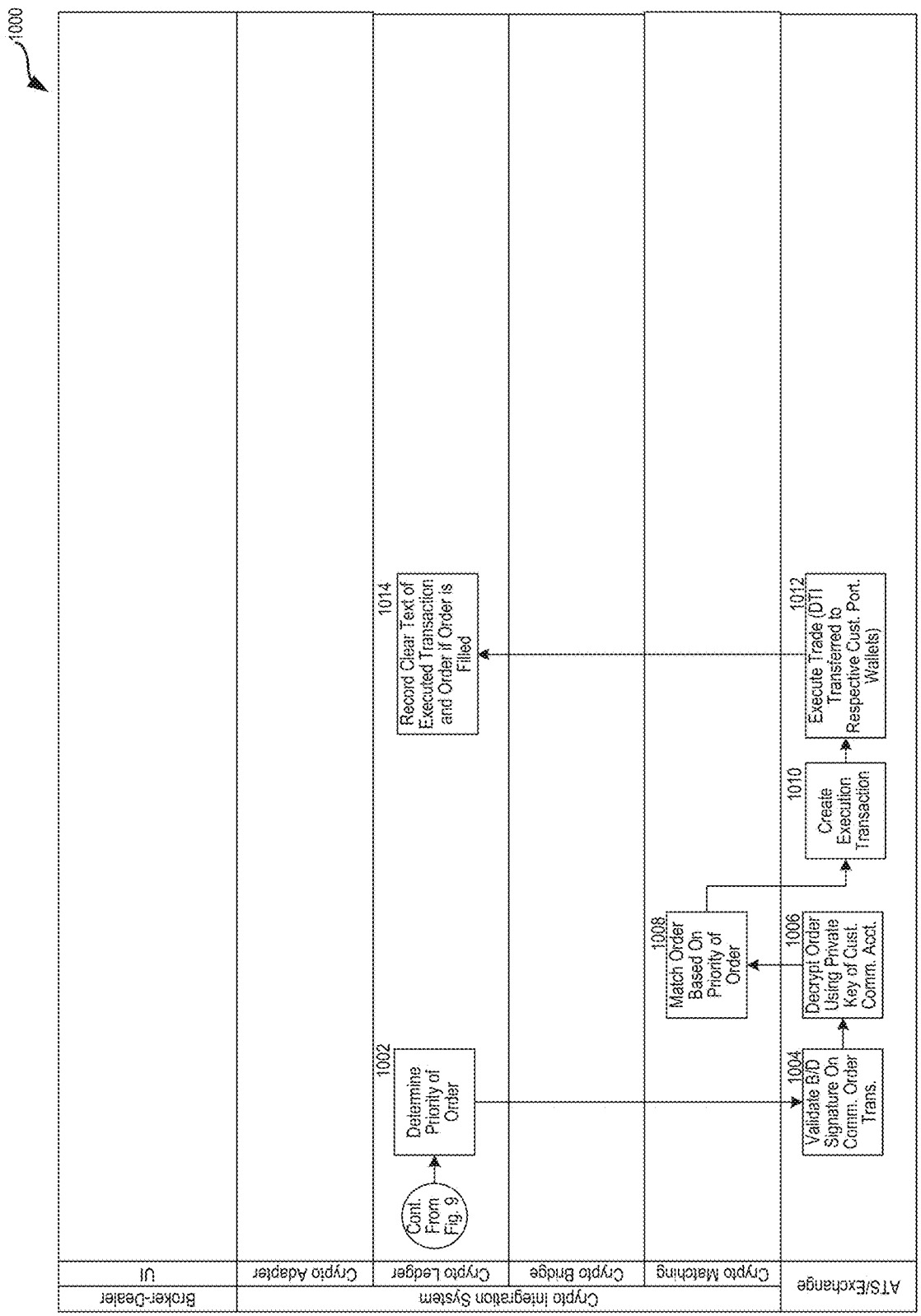

FIGS. 9-10 are diagrams illustrating a process of obfuscating an intent of an order until the order is executed in accordance with one or more embodiments of the present disclosure. A broker-dealer receives an order (902) and transfers digital transactional items to a customer portfolio account (904). The crypto adapter takes the FIX order (or other legacy protocol order) and translates the order to a crypto order (906). The crypto adapter queries a crypto ledger to ensure the digital transactional items are associated with the customer portfolio account (908). The crypto ledger obtains the customer portfolio account balance and provides the account balance to the crypto adapter (910). Once the crypto adapter has confirmed that the digital transactional items are associated with the customer portfolio account, the crypto adapter can create a commit transaction to transfer the digital transactional items to the customer committed account (912), which is controlled by the exchange. This commit transaction puts the digital transactional items into a pending state, similar to escrow, to ensure that the digital transactional items will be available when the order is executed. The commit transaction can include the digital transactional items and the public key of the customer committed account and can be signed by the crypto adapter with the private key of the customer portfolio account.

Once the digital transactional items are associated with the customer committed account, the crypto adapter can create a committed order transaction (914), which references the commit transaction and includes the order data, that is, the order particulars such as price, quantity, type of order (e.g., market, limit), security, side (e.g., buy side or sell side), broker dealer identifiers, trader identifiers (potentially anonymous), time in force (e.g., day, IOC), and ledger identifiers. The committed order transaction will associate the order with the customer committed account and will reference the commit transaction (i.e., to prevent double spending). The crypto bridge can encrypt the committed order transaction using the exchange public key (916). Next, the crypto bridge can sign the committed transaction order with the private key of the broker-dealer to transfer the order to the customer committed account (918). The crypto ledger can record the encrypted committed order transaction (920).

Moving to FIG. 10, the crypto ledger determines and assigns a priority of the order based on the time the order was received at the ATS/ledger (1002). The prioritizing ensures that orders are filled in the order they are received. The exchange validates the broker-dealer signature on the committed transaction order using the broker-dealer's public key (1004). This ensures that the transaction actually originated with the broker-dealer. Next, the exchange decrypts the order data using the exchange's private key (1006). The crypto matching component matches the order with a counterparty's order based on the priority of the order that was earlier assigned to the order (1008). In some embodiments, the exchange matches the orders, in addition to, or instead of the crypto matching component. The exchange creates an execution transaction (1010), such that the appropriate committed digital transactional items in the customer committed wallet are transferred to the other party's customer portfolio wallet and vice versa. Because the digital transactional items are associated with the customer committed accounts, which are controlled by the exchange, the exchange can use the exchange's private key to transfer the digital transactional items and settle the trade (1012).

The executed transaction can be published to the distributed ledger (i.e., Buyer 10 purchased 100 shares of Stock XYZ from Seller 3). In some embodiments, the executed transaction can be published to the ledger regardless of whether either order is filled or not because simply publishing an executed order does not give away the order intent. The clear text of the order can be published once the crypto matching component determines that the entire order is filled, i.e., executed (1014). Third parties can double check the validity of the order by encrypting the order data with the exchange's public key and comparing the outcome with the transaction that was sent to the exchange for matching and execution.

Various embodiments of the disclosure include:
1. A non-transitory computer-readable storage medium including a set of instructions that, when executed by one or more processors, cause a machine to:
   receive an order to trade at least one digital transactional item in exchange for at least one other digital transactional item via a trading system,
   create a committed order transaction that identifies data associated with the order,
   encrypt the data associated with the order using at least one credential associated with a first addressed account, wherein the at least one credential associated with the first addressed account is controlled by the trading system;
   cryptographically sign the committed order transaction using at least one credential associated with a second addressed account to transfer the committed order transaction to the first addressed account;
   decrypt, by the trading system, the encrypted order with another at least one credential associated with the first addressed account;

match the unencrypted order with a second order to trade at least a portion of the at least one other digital transactional item; and execute a first transaction by cryptographically transferring said portion of the at least one digital transactional item from the first addressed account and cryptographically transferring at least a portion of the at least one of the second digital transactional item to a third addressed account associated with a customer.

2. The non-transitory computer-readable storage medium of claim 1, wherein the set of instructions, when executed by the one or more processors, further cause the machine to:
generate executed transaction data of the first transaction in an unencrypted format;
determine whether the order has been filled by the first transaction; and
when the order has been filled by the first transaction, send, to a distributed ledger, a request to record the executed transaction data of the first transaction in the unencrypted format.

3. The non-transitory computer-readable storage medium of claim 2, wherein the set of instructions, when executed by the one or more processors, further cause the machine to:
when the order has not been filled by the first transaction, wait until the order has been filled by the first transaction and subsequent transactions;
after the order has been filled by the first transaction and the subsequent transactions: send, to the distributed ledger, a request to record the executed transaction data of the first transaction and of each of the subsequent transactions in the unencrypted format.

4. A computerized method comprising:
receiving an order to trade at least one digital transactional item in exchange for at least one other digital transactional item via a trading system;
creating a committed order transaction that identifies data associated with the order;
encrypting the data associated with the order using at least one credential associated with a first addressed account, wherein the at least one credential associated with the first addressed account is controlled by the trading system;
cryptographically signing the committed order transaction with at least one credential associated with a second addressed account; and
verifying, via a record recorded to a distributed ledger, that the order has been filled, wherein the record includes executed transaction data of at least a first executed transaction associated with the order in an unencrypted format, wherein the executed transaction data in the unencrypted format is not recorded until the order has been filled.

5. The computerized method of claim 4, further comprising:
sending, to the distributed ledger, a request to record the committed order transaction with the encrypted data, wherein the distributed ledger assigns a priority to the order.

6. The computerized method of claim 4, further comprising:
after the order has been verified, decrypted, matched, and executed by the trading system, receiving into a third addressed account the at least one other digital transactional items.

7. The computerized method of claim 4, further comprising:
after receiving the order to trade the at least one digital transactional item, verifying that the at least one digital transactional items are associated with a third addressed account; and
when the at least one digital transactional items are associated with the third addressed account, creating a commit transaction to cryptographically transfer the at least one digital transactional items to the first addressed account,
wherein creating the committed order transaction further comprises referencing the commit transaction in the committed order transaction to prevent the at least one digital transactional items from being referenced in a second committed order transaction.

8. The computerized method of claim 4, wherein the at least one digital transactional item comprises a digital security or a digital representation of funds, wherein the data comprises one or more of an identity of the at least one first digital transactional items, a price at which to purchase or sell the at least one first digital transactional items, and a quantity of which to purchase or sell the at least one first digital transactional items.

9. A cryptographic integration system, comprising:
at least one processor; and
at least one computer readable storage medium having instructions stored thereon, which when executed by the at least one processor cause the cryptographic integration system to:
receive an order to trade at least one digital transactional item in exchange for at least one other digital transactional item via a trading system;
create a committed order transaction that identifies data associated with the order;
encrypt the data associated with the order using at least one credential associated with a first addressed account, wherein the at least one credential associated with the first addressed account is controlled by the trading system;
cryptographically sign the committed order transaction with at least one credential associated with a second addressed account; and
verify, via a record recorded to a distributed ledger, that the order has been filled, wherein the record includes executed transaction data of at least a first executed transaction associated with the order in an unencrypted format, wherein the executed transaction data in the unencrypted format is not recorded until the order has been filled.

10. The cryptographic integration system of claim 9, wherein the instructions, which when executed by the at least one processor, further cause the crypto integration system to:
send, to the distributed ledger, a request to record the committed order transaction with the encrypted data, wherein the distributed ledger assigns a priority to the order.

11. The cryptographic integration system of claim 9, wherein the instructions, which when executed by the at least one processor, further cause the crypto integration system to:
after the order has been verified, decrypted, matched, and executed by the trading system, receive into a third addressed account the at least one other digital transactional items.

12. The cryptographic integration system of claim 9, wherein the instructions, which when executed by the at least one processor, further cause the crypto integration system to:

after receiving the order to trade the at least one digital transactional item, verify that the at least one digital transactional items are associated with a third addressed account; and when the at least one digital transactional items are associated with the third addressed account, create a commit transaction to cryptographically transfer the at least one digital transactional items to the first addressed account, wherein the instructions, that when executed by the at least one processor cause the crypto integration system to create the committed order transaction further cause the crypto integration system to reference the commit transaction in the committed order transaction to prevent the at least one digital transactional items from being referenced in a second committed order transaction.

13. A computerized method comprising:

receiving, into a first customer committed addressed account, an encrypted order to trade at least one digital transactional item in exchange for at least one other digital transactional item;

decrypting, by a trading system, the encrypted order using at least one credential associated with the first customer committed addressed account;

matching the unencrypted order with a second order to trade at least a portion of the at least one digital transactional item;

executing a first transaction by cryptographically transferring at least a portion of the at least one digital transactional items from the first customer committed addressed account and cryptographically transferring at least a portion of the at least one other digital transactional items to a first customer portfolio addressed account; and when the order has been filled, sending, to a distributed ledger for recordation, executed transaction data of the first transaction that includes data from the order in an unencrypted format to allow for third party verification of the order and the trade.

14. The computerized method of claim 13, wherein the encrypted order is recorded to the distributed ledger that assigns a priority to the encrypted order based on a time of receipt at the distributed ledger, and wherein matching the unencrypted order with the second order is based on the assigned priority.

15. The computerized method of claim 13, further comprising verifying a sender of the encrypted order using a credential of a broker-dealer account, wherein the credential is a public key.

16. The computerized method of claim 13, further comprising executing a second trade by cryptographically transferring a second portion of the at least one digital transactional item, wherein the executed transaction data includes data from both the trade and the second trade.

17. A trading system, comprising:

at least one processor; and at least one computer readable storage medium having instructions stored thereon, which when executed by the at least one processor causes the cryptographic integration system to:

receive, into a first customer committed addressed account, an encrypted order to trade at least one digital transactional item in exchange for at least one other digital transactional item;

decrypt, by a trading system, the encrypted order using at least one credential associated with the first customer committed addressed account;

match the unencrypted order with a second order to trade at least a portion of the at least one digital transactional item;

execute a first transaction by cryptographically transferring at least a portion of the at least one digital transactional items from the first customer committed addressed account and cryptographically transfer at least a portion of the at least one other digital transactional items to a first customer portfolio addressed account; and when the order has been filled, send, to a distributed ledger for recordation, executed transaction data of the first transaction that includes data from the order in an unencrypted format to allow for third party verification of the order and the trade.

18. The trading system of claim 17, wherein the encrypted order is recorded to the distributed ledger that assigns a priority to the encrypted order based on a time of receipt, and wherein matching the unencrypted order with the second order is based on the assigned priority.

19. The trading system of claim 17, wherein the instructions, which when executed by the at least one processor, further cause the trading system to verify a sender of the encrypted order using a credential of a broker-dealer account, wherein the credential is a public key.

20. The trading system of claim 17, wherein the instructions, which when executed by the at least one processor, further cause the trading system to execute a second trade by cryptographically transferring a second portion of the at least one digital transactional item, wherein the executed transaction data includes data from both the trade and the second trade.

Computer System Overview

Figure 11:
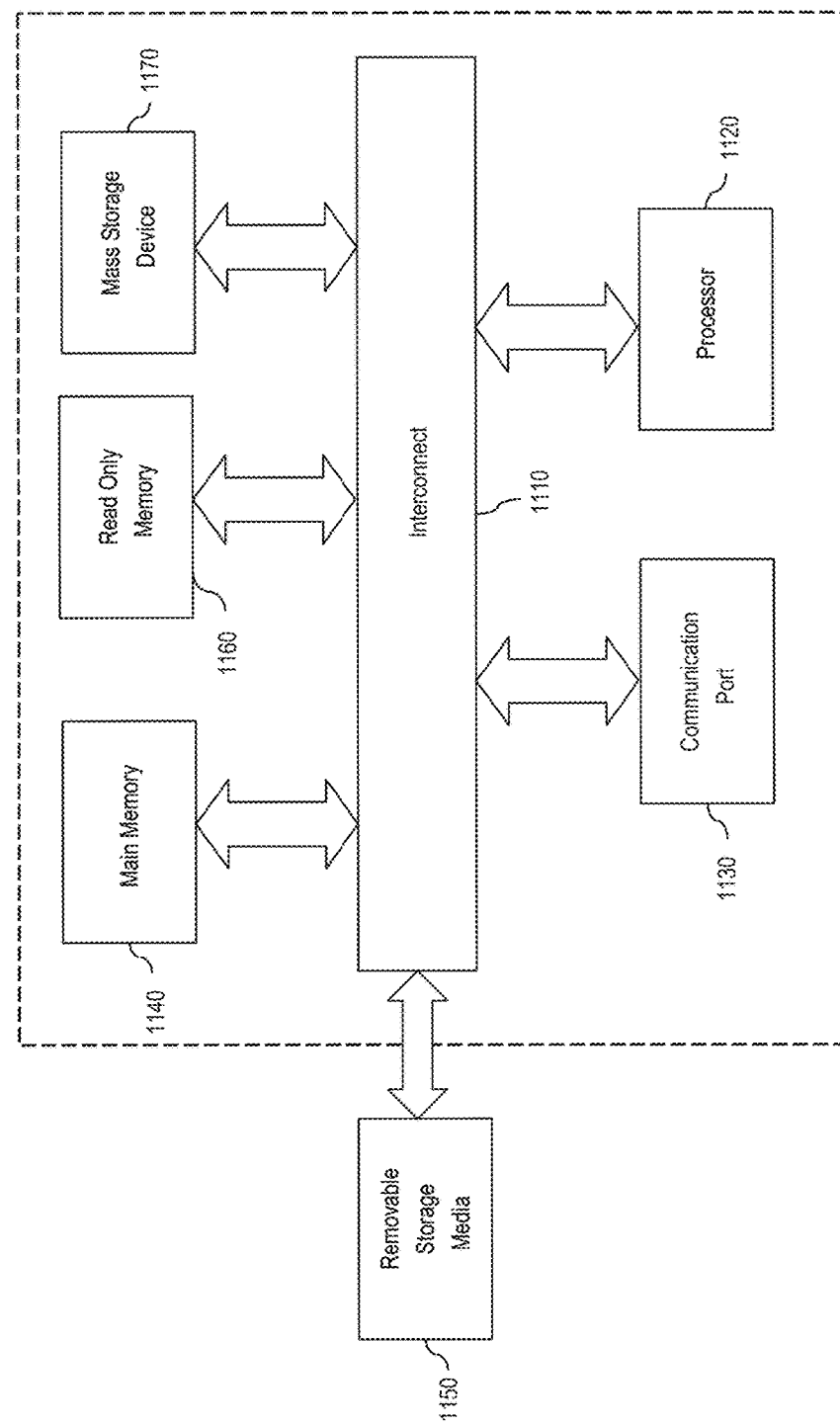
FIG. 11 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 11 is an example of a computer system 1100 with which embodiments of the present disclosure may be utilized. According to the present example, the computer system 1100 includes an interconnect 1110, at least one processor 1120, at least one communication port 1130, a main memory 1140, a removable storage media 1150, a read only memory 1160, and a mass storage device 1170.

Processor 1120 can be any known processor. Communication port 1130 can be or include, for example, any of an RS-232 port for use with a modem-based dialup connection, a 10/100 Ethernet port, or a Gigabit port using copper or fiber. The nature of communication port 1130 may be chosen depending on a network such a Local Area Network (LAN), Wide Area Network (WAN), or any network to which the computer system 1100 connects.

Main memory 1140 can be Random Access Memory (RAM), or any other dynamic storage device commonly known in the art. Read only memory 1160 can be any static storage device such as Programmable Read Only Memory (PROM) chips for storing static information such as instructions for processor 1120.

Mass storage device 1170 can be used to store information and instructions. For example, hard disks such as the Adaptec® family of SCSI drives, an optical disc, an array of disks such as RAID, such as the Adaptec family of RAID drives, or any other mass storage devices may be used.

Interconnect 1110 can be or include one or more buses, bridges, controllers, adapters, and/or point-to-point connections. Interconnect 1110 communicatively couples processor 1120 with the other memory, storage, and communication blocks. Interconnect 1110 can be a PCI/PCI-X or SCSI based system bus depending on the storage devices used.

Removable storage media 1150 can be any kind of external hard-drives, floppy drives, Compact Disc-Read-Only Memory (CD-ROM), Compact Disc-Re-Writable (CD-RW), Digital Video Disc-Read-Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for obfuscating intent of a transaction. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A non-transitory computer-readable storage medium including a set of instructions that, when executed by one or more processors, cause a machine to:

receive an order to trade at least one digital transactional item in exchange for at least one other digital transactional item via a trading system, create a committed order transaction that identifies data associated with the order, encrypt the data associated with the order using at least one credential associated with a first addressed account, wherein the at least one credential associated with the first addressed account is controlled by the trading system;

cryptographically sign the committed order transaction using at least one credential associated with a second addressed account to transfer the committed order transaction to the first addressed account;

decrypt, by the trading system, the encrypted order with another at least one credential associated with the first addressed account;

match an unencrypted order with a second order to trade at least a portion of the at least one other digital transactional item;

execute a first transaction by cryptographically transferring said portion of the at least one digital transactional item from the first addressed account and cryptographically transferring at least a portion of the at least one of the second digital transactional item to a third addressed account associated with a customer;
generate executed transaction data of the first transaction in an unencrypted format;
determine whether the order has been filled by the first transaction;
when the order has been filled by the first transaction:
send, to a distributed ledger, a request to record the executed transaction data of the first transaction in the unencrypted format;
when the order has not been filled by the first transaction:
wait until the order has been filled by the first transaction and subsequent transactions;
after the order has been filled by the first transaction and the subsequent transactions:
send, to the distributed ledger, a request to record the executed transaction data of the first transaction and of each of the subsequent transactions in the unencrypted format.

2. A computerized method comprising:
receiving an order to trade at least one digital transactional item in exchange for at least one other digital transactional item via a trading system;
creating a committed order transaction that identifies data associated with the order;
encrypting the data associated with the order using at least one credential associated with a first addressed account, wherein the at least one credential associated with the first addressed account is controlled by the trading system;
cryptographically signing the committed order transaction with at least one credential associated with a second addressed account; and
verifying, via a record recorded to a distributed ledger, that the order has been filled, wherein the record includes executed transaction data of at least a first executed transaction associated with the order in an unencrypted format, wherein the executed transaction data in the unencrypted format is not recorded until the order has been filled.

3. The computerized method of claim 2, further comprising:
sending, to the distributed ledger, a request to record the committed order transaction with the encrypted data, wherein the distributed ledger assigns a priority to the order.

4. The computerized method of claim 2, further comprising:
after the order has been verified, decrypted, matched, and executed by the trading system, receiving into a third addressed account the at least one other digital transactional items.

5. The computerized method of claim 2, further comprising:
after receiving the order to trade the at least one digital transactional item, verifying that the at least one digital transactional items are associated with a third addressed account; and
when the at least one digital transactional items are associated with the third addressed account, creating a commit transaction to cryptographically transfer the at least one digital transactional items to the first addressed account,
wherein creating the committed order transaction further comprises referencing the commit transaction in the committed order transaction to prevent the at least one digital transactional items from being referenced in a second committed order transaction.

6. The computerized method of claim 2, wherein the at least one digital transactional item comprises a digital security or a digital representation of funds, wherein the data comprises one or more of an identity of the at least one first digital transactional items, a price at which to purchase or sell the at least one first digital transactional items, and a quantity of which to purchase or sell the at least one first digital transactional items.

7. A cryptographic integration system, comprising:
at least one processor; and
at least one computer readable storage medium having instructions stored thereon, which when executed by the at least one processor cause the cryptographic integration system to:
receive an order to trade at least one digital transactional item in exchange for at least one other digital transactional item via a trading system;
create a committed order transaction that identifies data associated with the order;
encrypt the data associated with the order using at least one credential associated with a first addressed account, wherein the at least one credential associated with the first addressed account is controlled by the trading system;
cryptographically sign the committed order transaction with at least one credential associated with a second addressed account; and
verify, via a record recorded to a distributed ledger, that the order has been filled, wherein the record includes executed transaction data of at least a first executed transaction associated with the order in an unencrypted format, wherein the executed transaction data in the unencrypted format is not recorded until the order has been filled.

8. The cryptographic integration system of claim 7, wherein the instructions, which when executed by the at least one processor, further cause the cryptographic integration system to:
send, to the distributed ledger, a request to record the committed order transaction with the encrypted data, wherein the distributed ledger assigns a priority to the order.

9. The cryptographic integration system of claim 7, wherein the instructions, which when executed by the at least one processor, further cause the cryptographic integration system to:
after the order has been verified, decrypted, matched, and executed by the trading system, receive into a third addressed account the at least one other digital transactional items.

10. The cryptographic integration system of claim 7, wherein the instructions, which when executed by the at least one processor, further cause the cryptographic integration system to:
after receiving the order to trade the at least one digital transactional item, verify that the at least one digital transactional items are associated with a third addressed account; and
when the at least one digital transactional items are associated with the third addressed account, create a commit transaction to cryptographically transfer the at least one digital transactional items to the first addressed account,
wherein the instructions, that when executed by the at least one processor cause the cryptographic integration system to create the committed order transaction further cause the cryptographic integration system to reference the commit transaction in the committed order transaction to prevent the at least one digital transactional items from being referenced in a second committed order transaction.

11. A computerized method comprising:
receiving, into a first customer committed addressed account, an encrypted order to trade at least one digital transactional item in exchange for at least one other digital transactional item;
decrypting, by a trading system, the encrypted order using at least one credential associated with the first customer committed addressed account;
matching the unencrypted order with a second order to trade at least a portion of the at least one digital transactional item;
executing a first transaction by cryptographically transferring at least a portion of the at least one digital transactional items from the first customer committed addressed account and cryptographically transferring at least a portion of the at least one other digital transactional items to a first customer portfolio addressed account; and
when the order has been filled, sending, to a distributed ledger for recordation, executed transaction data of the first transaction that includes data from the order in an unencrypted format to allow for third party verification of the order and the trade.

12. The computerized method of claim 11, wherein the encrypted order is recorded to the distributed ledger that assigns a priority to the encrypted order based on a time of receipt at the distributed ledger, and wherein matching the unencrypted order with the second order is based on the assigned priority.

13. The computerized method of claim 11, further comprising verifying a sender of the encrypted order using a credential of a broker-dealer account, wherein the credential is a public key.

14. The computerized method of claim 11, further comprising executing a second trade by cryptographically transferring a second portion of the at least one digital transactional item, wherein the executed transaction data includes data from both the trade and the second trade.

15. A trading system, comprising:
at least one processor; and
at least one computer readable storage medium having instructions stored thereon, which when executed by the at least one processor causes a cryptographic integration system to:
receive, into a first customer committed addressed account, an encrypted order to trade at least one digital transactional item in exchange for at least one other digital transactional item;
decrypt, by a trading system, the encrypted order using at least one credential associated with the first customer committed addressed account;
match the unencrypted order with a second order to trade at least a portion of the at least one digital transactional item;
execute a first transaction by cryptographically transferring at least a portion of the at least one digital transactional items from the first customer committed addressed account and cryptographically transfer at least a portion of the at least one other digital transactional items to a first customer portfolio addressed account; and
when the order has been filled, send, to a distributed ledger for recordation, executed transaction data of the first transaction that includes data from the order in an unencrypted format to allow for third party verification of the order and the trade.

16. The trading system of claim 15, wherein the encrypted order is recorded to the distributed ledger that assigns a priority to the encrypted order based on a time of receipt, and wherein matching the unencrypted order with the second order is based on the assigned priority.

17. The trading system of claim 15, wherein the instructions, which when executed by the at least one processor, further cause the trading system to verify a sender of the encrypted order using a credential of a broker-dealer account, wherein the credential is a public key.

18. The trading system of claim 15, wherein the instructions, which when executed by the at least one processor, further cause the trading system to execute a second trade by cryptographically transferring a second portion of the at least one digital transactional item, wherein the executed transaction data includes data from both the trade and the second trade.

* * * * *